US012604366B2

(12) United States Patent
Babaei

(10) Patent No.: US 12,604,366 B2
(45) Date of Patent: Apr. 14, 2026

(54) MULTICAST SERVICE DELIVERY FOR USE IN INACTIVE STATE

(71) Applicant: Parsa Wireless Communications LLC, Stamford, CT (US)

(72) Inventor: Alireza Babaei, Fairfax, VA (US)

( * ) Notice: Subject to any disclaimer, the term of this patent is extended or adjusted under 35 U.S.C. 154(b) by 345 days.

(21) Appl. No.: 18/121,082

(22) Filed: Mar. 14, 2023

(65) Prior Publication Data

US 2023/0328843 A1    Oct. 12, 2023

Related U.S. Application Data

(60) Provisional application No. 63/321,547, filed on Mar. 18, 2022.

(51) Int. Cl.
| | | |
|---|---|---|
| *H04W 76/40* | (2018.01) | |
| *H04W 76/27* | (2018.01) | |
| *H04W 74/0833* | (2024.01) | |
| *H04W 74/0836* | (2024.01) | |
| *H04W 74/0838* | (2024.01) | |

(52) U.S. Cl.
CPC ........... *H04W 76/40* (2018.02); *H04W 76/27* (2018.02); *H04W 74/0833* (2013.01); *H04W 74/0836* (2024.01); *H04W 74/0838* (2024.01)

(58) Field of Classification Search
CPC . H04W 76/40; H04W 74/0833; H04W 76/27; H04W 74/0836; H04W 74/0838; H04W 72/115; H04W 72/30
USPC .... 370/312, 329, 328; 455/13.4, 414.1, 466, 455/552
See application file for complete search history.

(56) References Cited

U.S. PATENT DOCUMENTS

| | | | | |
|---|---|---|---|---|
| 11,457,431 | B2 * | 9/2022 | Tseng ................... | H04W 76/14 |
| 11,683,665 | B2 * | 6/2023 | Kim ....................... | H04W 4/06 |
| | | | | 370/312 |
| 2011/0019604 | A1 * | 1/2011 | Chun .................. | H04W 72/535 |
| | | | | 370/312 |
| 2018/0270812 | A1 * | 9/2018 | Lee ....................... | H04W 72/20 |
| 2019/0116467 | A1 * | 4/2019 | Belleschi .............. | H04W 76/27 |
| 2021/0014926 | A1 * | 1/2021 | Xu ......................... | H04W 76/10 |
| 2021/0029516 | A1 * | 1/2021 | Wang .................... | H04W 76/14 |
| 2021/0337625 | A1 * | 10/2021 | Tsai ...................... | H04W 76/27 |
| 2021/0378053 | A1 * | 12/2021 | Saily .................... | H04W 76/40 |
| 2022/0225465 | A1 * | 7/2022 | Xu ......................... | H04W 76/27 |
| 2022/0248493 | A1 * | 8/2022 | Kim .................. | H04W 36/0033 |
| 2023/0362595 | A1 * | 11/2023 | Fujishiro .............. | H04W 76/40 |
| 2023/0380002 | A1 * | 11/2023 | Hong .................. | H04W 68/005 |
| 2023/0403759 | A1 * | 12/2023 | Li ......................... | H04W 76/40 |
| 2024/0031776 | A1 * | 1/2024 | Dai ....................... | H04W 76/40 |

(Continued)

FOREIGN PATENT DOCUMENTS

| | | | | | |
|---|---|---|---|---|---|
| WO | WO-2021062974 | A1 * | 4/2021 | ............ | H04W 76/19 |
| WO | WO-2021163394 | A1 * | 8/2021 | ........ | H04W 36/0033 |

(Continued)

*Primary Examiner* — Ricardo H Castaneyra
(74) *Attorney, Agent, or Firm* — John F. Vodopia Pc

(57) ABSTRACT

A method of multicast data delivery in a radio resource control (RRC) inactive state includes receiving, by a user equipment (UE) in an RRC connected state, an RRC release message indicating transitioning of the UE from the RRC connected state to an RRC inactive state and receiving, while in the RRC inactive state, multicast data in response to joining a multicast group and receiving multicast configuration parameters.

20 Claims, 20 Drawing Sheets

(56)         References Cited

U.S. PATENT DOCUMENTS

| | | | |
|---|---|---|---|
| 2024/0080141 A1* | 3/2024 | Zhou | H04L 1/1854 |
| 2024/0260062 A1* | 8/2024 | Zhou | H04L 1/1896 |
| 2024/0267938 A1* | 8/2024 | Fujishiro | H04W 68/00 |

FOREIGN PATENT DOCUMENTS

| | | | | |
|---|---|---|---|---|
| WO | WO-2022026647 A1 * | 2/2022 | | H04W 12/106 |
| WO | WO-2022225861 A1 * | 10/2022 | | H04W 72/30 |
| WO | WO-2023008847 A1 * | 2/2023 | | H04L 5/001 |
| WO | WO-2023096397 A1 * | 6/2023 | | H04W 4/06 |
| WO | WO-2023123407 A1 * | 7/2023 | | H04B 17/328 |
| WO | WO-2023165588 A1 * | 9/2023 | | |

* cited by examiner

FIG. 3A

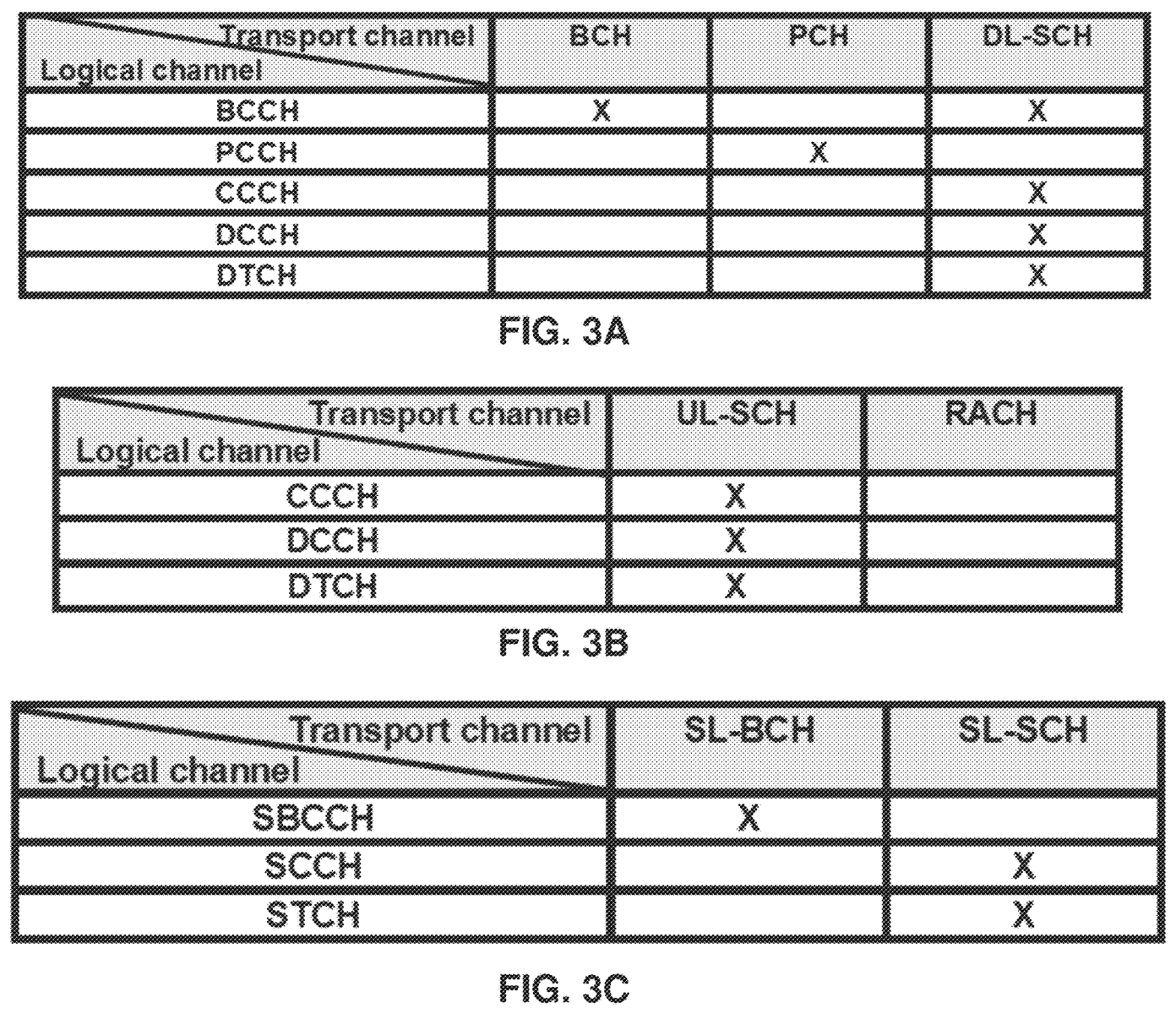

| Transport channel / Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3B

| Transport channel / Logical channel | UL-SCH | RACH |
|---|---|---|
| CCCH | X | |
| DCCH | X | |
| DTCH | X | |

FIG. 3C

| Transport channel / Logical channel | SL-BCH | SL-SCH |
|---|---|---|
| SBCCH | X | |
| SCCH | | X |
| STCH | | X |

| Physical channel Transport channel | PDSCH | PDCCH | PBCH |
|---|---|---|---|
| BCH | | | X |
| PCH | X | | |
| DL-SCH | X | | |

FIG. 4A

| Physical channel Transport channel | PUSCH | PUCCH | PRACH |
|---|---|---|---|
| UL-SCH | X | | |
| RACH | | | X |

FIG. 4B

| Physical channel Transport channel | PSSCH | PSCCH | PSFCH | PSBCH |
|---|---|---|---|---|
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

4-step CFRA 4-step CBRA

MULTICAST SERVICE DELIVERY FOR USE IN INACTIVE STATE

CROSS-REFERENCE TO RELATED APPLICATION

This application claims priority under 35 USC § 119(e) from U.S. Provisional Patent Application No. 63/321,547, filed on Mar. 18, 2022 ("the provisional application"); the content of the provisional patent application is incorporated herein by reference.

BACKGROUND OF THE INVENTION

The present invention is directed to 5G, which is the $5^{th}$ generation mobile network. It is a new global wireless standard after 1G, 2G, 3G, and 4G networks. 5G enables networks designed to connect machines, objects and devices.

The invention is more specifically directed to enhancing existing multicast processes for multicast service/data delivery during the radio resource control (RRC) inactive state. Example embodiments set forth and described here enhance the existing multicast processes for multicast service/data delivery during the RRC inactive state.

SUMMARY OF THE INVENTION

A method of multicast data delivery in a radio resource control (RRC) inactive state includes receiving, by a user equipment (UE) in an RRC connected state, an RRC release message indicating transitioning of the UE from the RRC connected state to an RRC inactive state and receiving, while in the RRC inactive state, multicast data in response to joining a multicast group and receiving multicast configuration parameters. While in the radio resource control (RRC) connected state and before receiving the RRC release message, the user equipment (UE) may join the multicast group and receiving the multicast configuration parameters.

The multicast configuration parameters may comprise first multicast configuration parameters for multicast data reception during the radio resource control (RRC) connected state and second multicast configuration parameters for multicast data reception during the radio resource control (RRC) inactive state. While in the radio resource control (RRC) inactive state and after receiving the RRC release message, the user equipment (UE) may join the multicast group or receive the multicast configuration parameters or both. Joining the multicast group may occur while the user equipment (UE) in the radio resource control (RRC) inactive state where the UE receives the multicast configuration parameters after transitioning to the RRC connected state. Joining the multicast group, while the user equipment (UE) is in the radio resource control (RRC) inactive state, may occur based on a random access process. Joining the multicast group may be via a message A (MsgA) of a two-step random access process or a message 3 (Msg3) of a four-step random access process.

Preferably, the radio resource control (RRC) release message comprises one or more configuration parameters for the random access process. Receiving the multicast configuration parameters, while the user equipment (UE) is in the radio resource control (RRC) inactive state, may occur based on the random access process. Receiving the multicast configuration parameters, while the user equipment (UE) is in the radio resource control (RRC) inactive state, may occur based on a message B (MsgB) of a two-step random access process or a message 4 (Msg4) of a four-step random access process. Joining the multicast group, while the user equipment (UE) is in the radio resource control (RRC) inactive state, may occur based on a configured grant. The method may further comprise transmitting a transport block, via radio resources of the configured grant, where the transport block indicates the request to join the multicast group.

Preferably, the radio resource control (RRC) release message comprises configured grant configuration parameters. Determining the configured grant may be based on the configured grant configuration parameters. Receiving the multicast configuration parameters, while the user equipment (UE) is in the radio resource control (RRC) inactive state, may occur based on a pre-configured downlink assignment in the RRC inactive state. The user equipment (UE) may receive a downlink transport block, comprising the multicast configuration parameters, based on the pre-configured downlink assignment. Receiving the multicast configuration parameters, while the user equipment (UE) is in the radio resource control (RRC) inactive state, may occur based on a semi-persistent scheduling (SPS) downlink assignment in the RRC inactive state. The radio resource control (RRC) release message may comprise semi-persistent scheduling (SPS) configuration parameters. For that matter, the method may further comprise determining the semi-persistent scheduling (SPS) downlink assignment based on the SPS configuration parameters.

In an embodiment, the invention provides a method of multicast data delivery in a radio resource control (RRC) inactive state, including receiving, by a user equipment (UE) in an RRC connected state, an RRC release message indicating transitioning of the UE from the RRC connected state to an RRC inactive state and in response to joining a multicast group, determining a bandwidth part (BWP) for reception of paging information and multicast data during the RRC inactive state and receiving the paging information and the multicast data via the determined BWP. The determined bandwidth part (BWP) may be an initial BWP for paging during the radio resource control (RRC) inactive state. A common frequency resource (CFR) associated with the multicast data may be in the initial BWP for paging during the radio resource control (RRC) inactive state. The common frequency resource (CFR) may be used for receiving scheduling information associated with the multicast data. The determined bandwidth part (BWP) may be a BWP associated with multicast data comprising a common frequency resource (CFR). While in the radio resource control (RRC) inactive state, the bandwidth part (BWP) associated with the multicast data may be used for reception of paging information.

In an embodiment, the invention provides a method of feedback for multicast data in a radio resource control (RRC) inactive state, including receiving, by a user equipment (UE), an RRC release message: indicating transitioning of the UE from an RRC connected state to an RRC inactive state and comprising an information element indicating whether UE feedback transmission during the RRC inactive state is enabled or disabled and transmitting the UE feedback, while the UE is in the RRC inactive state, in response to the information element being enabled. The user equipment (UE) feedback may be associated with multicast data transmission. The user equipment (UE) feedback may be a hybrid automatic repeat request (HARQ) feedback. The user equipment (UE) feedback may be channel state information (CSI) report.

Transmitting the user equipment (UE) feedback may occur based on an uplink control channel or an uplink shared channel or a random access channel. Transmitting the user equipment (UE) feedback may occur based on a configured grant resource. Transmitting the user equipment (UE) feedback may occur based on a random access process. In the method, the user equipment (UE) feedback may be a hybrid automatic repeat request (HARQ) feedback and transmitting the UE feedback may occur based on a random access preamble. The user equipment (UE) feedback may be for hybrid automatic repeat request (HARQ) negative acknowledgment (NACK).

In an embodiment, the invention provides a method of feedback for multicast data in a radio resource control (RRC) inactive state, including receiving, by a user equipment (UE) in an RRC connected state, an RRC release message indicating transitioning from the RRC connected state to an RRC inactive state, determining, based on one or more multicast configuration parameters, whether the UE is allowed to receive multicast data during the RRC inactive state and receiving the multicast data where it is determined that the UE is allowed to receive the multicast data. The one or more multicast configuration parameters may comprise one or more received signal received strength (RSRP) thresholds or one or more time values. The method may further include transitioning, where the user equipment (UE) is in the inactive state, to the radio resource control (RRC) connected state in response to determining that the UE is not allowed to receive multicast data during the RRC inactive state. The method may also include determining whether to transmit user equipment (UE) feedback associated with the multicast data based on the one or more multicast configuration parameters.

Existing multicast data transmission processes enable multicast data (e.g., using point to multi-point (PTM) configurations) during the RRC connected state and a UE in an RRC inactive state may transition to the RRC connected state to receive the multicast data. There are use cases that require multicast data reception during the RRC inactive state without a state transition. There is a need to enhance the existing multicast processes for multicast service/data delivery during the RRC inactive state. Example embodiments enhance the existing multicast processes for multicast service/data delivery during the RRC inactive state.

Figure 2A:
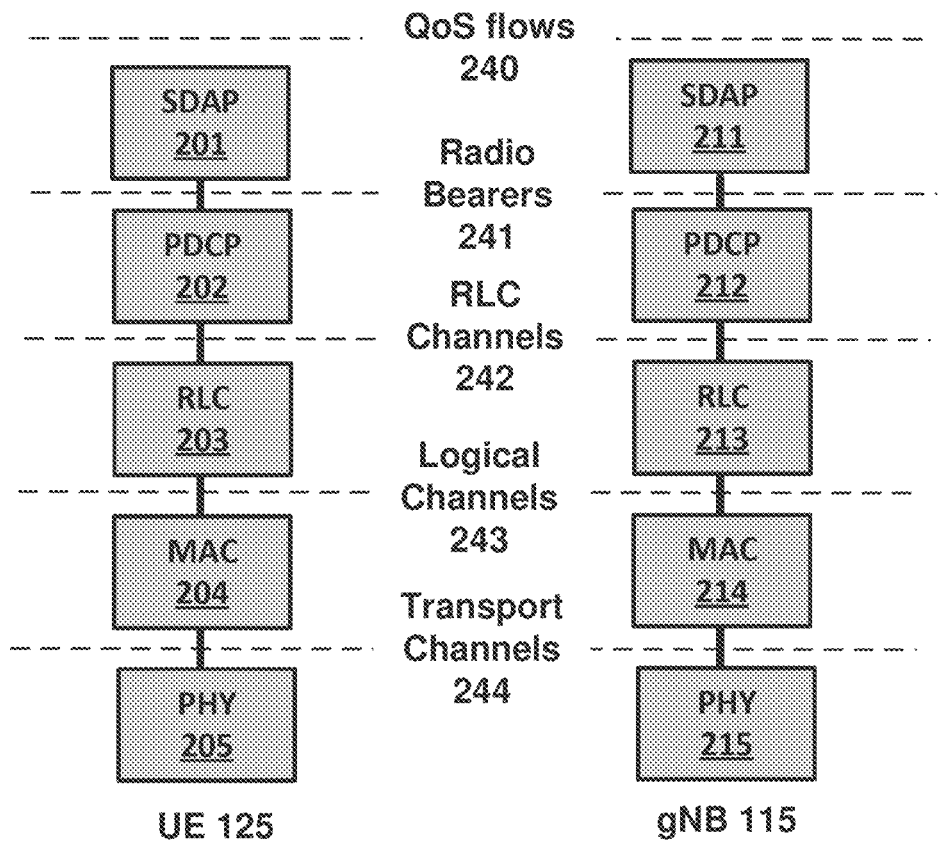
Figure 2B:
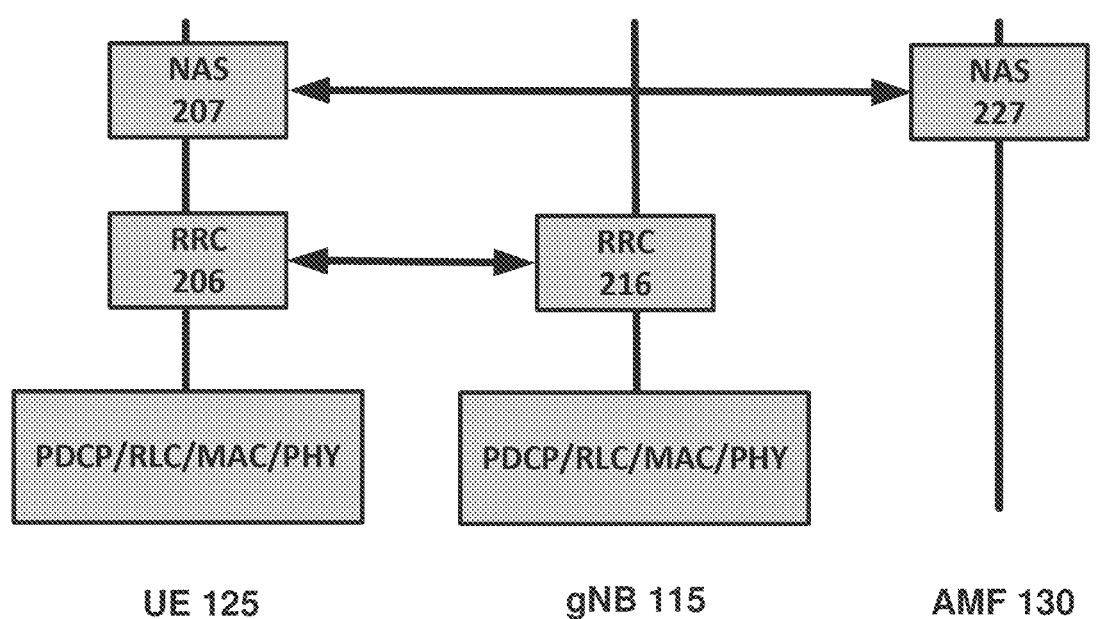

FIG. 2A and FIG. 2B show examples of radio protocol stacks for user plane and control plane, respectively, according to some aspects of some of various exemplary embodiments of the present disclosure.

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 5A, FIG. 5B, FIG. 5C and FIG. 5D show examples of radio protocol stacks for NR sidelink communication according to some aspects of some of various exemplary embodiments of the present disclosure.

FIG. 6 shows example physical signals in downlink, uplink and sidelink according to some aspects of some of various exemplary embodiments of the present disclosure.

Figure 7:
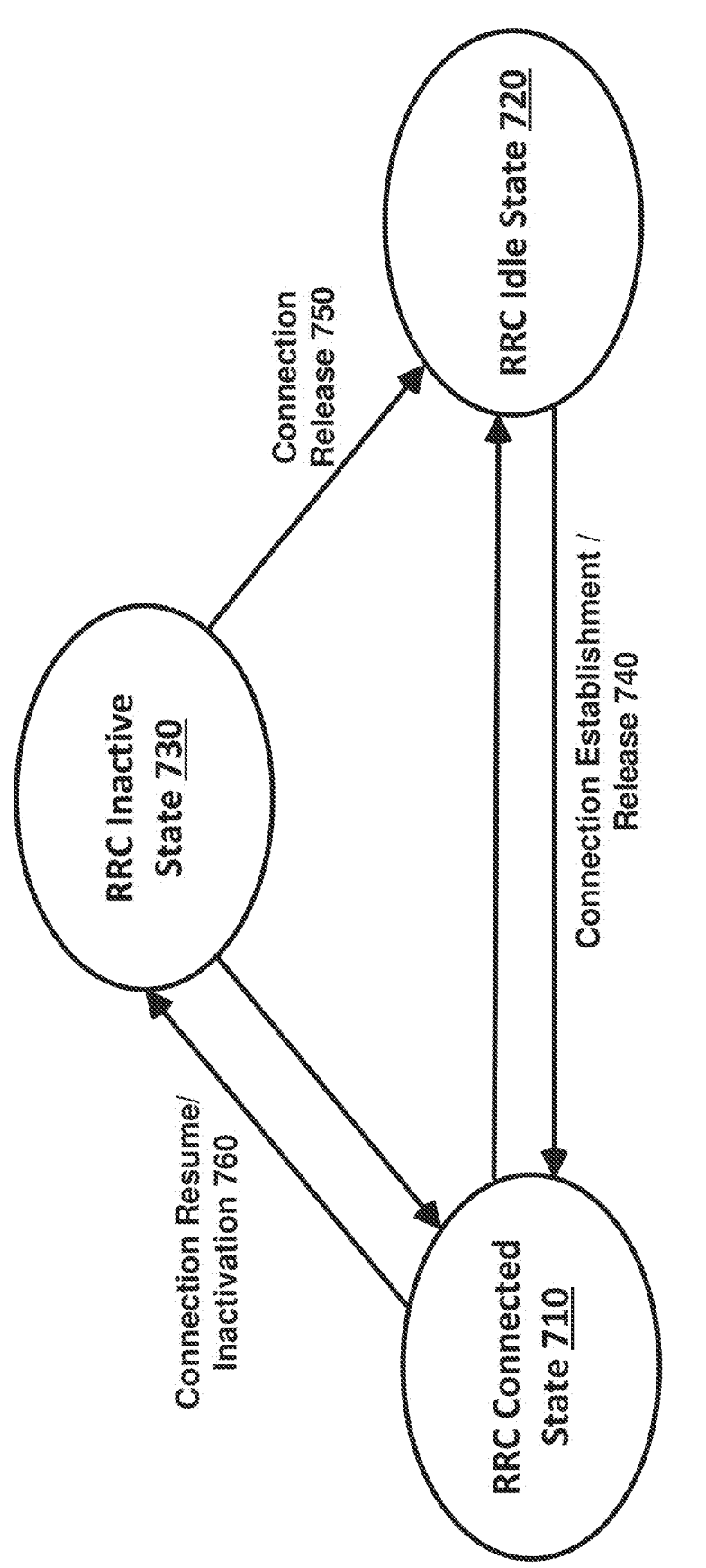

FIG. 7 shows examples of Radio Resource Control (RRC) states and transitioning between different RRC states according to some aspects of some of various exemplary embodiments of the present disclosure.

Figure 8:
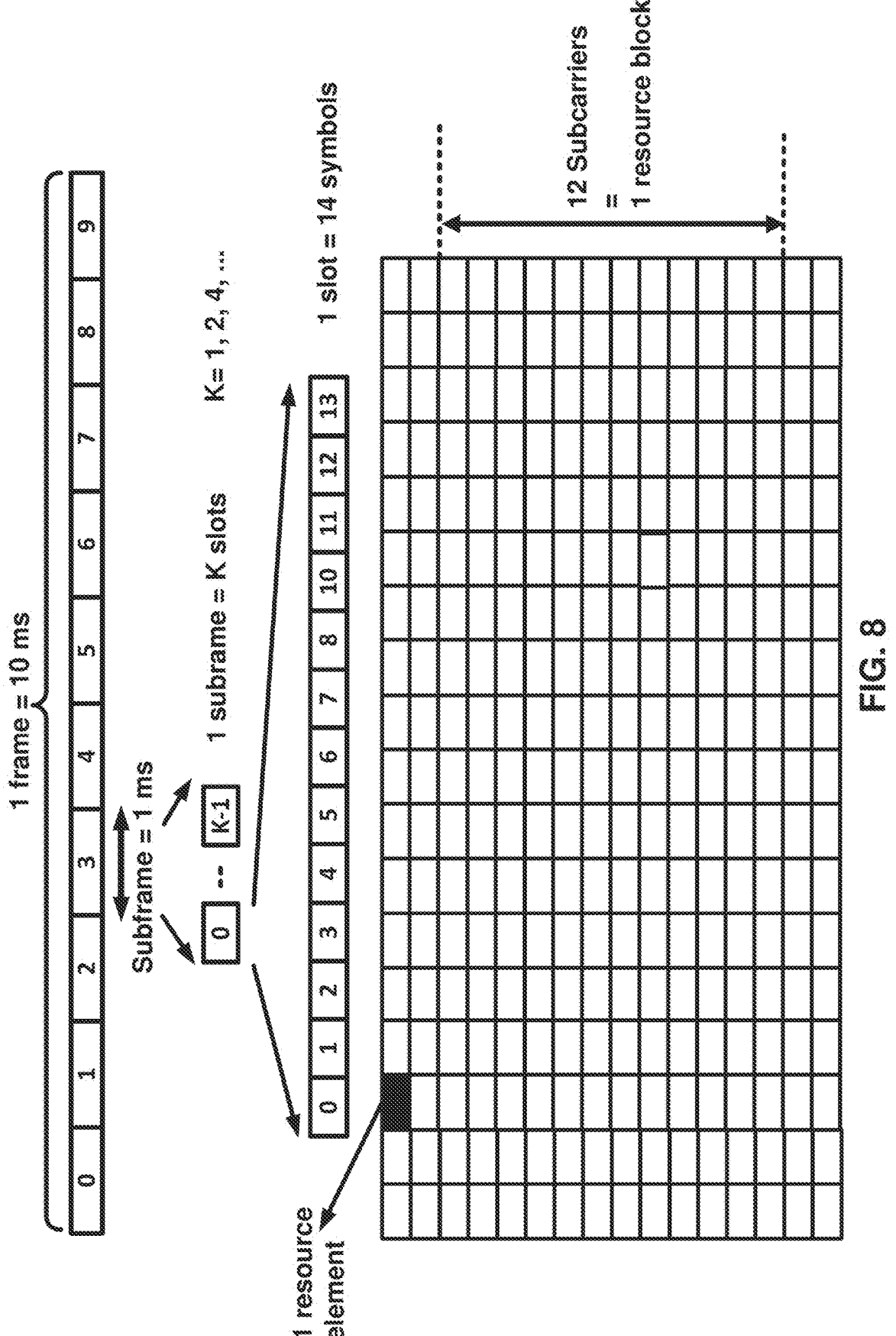

FIG. 8 shows example frame structure and physical resources according to some aspects of some of various exemplary embodiments of the present disclosure.

Figure 9:
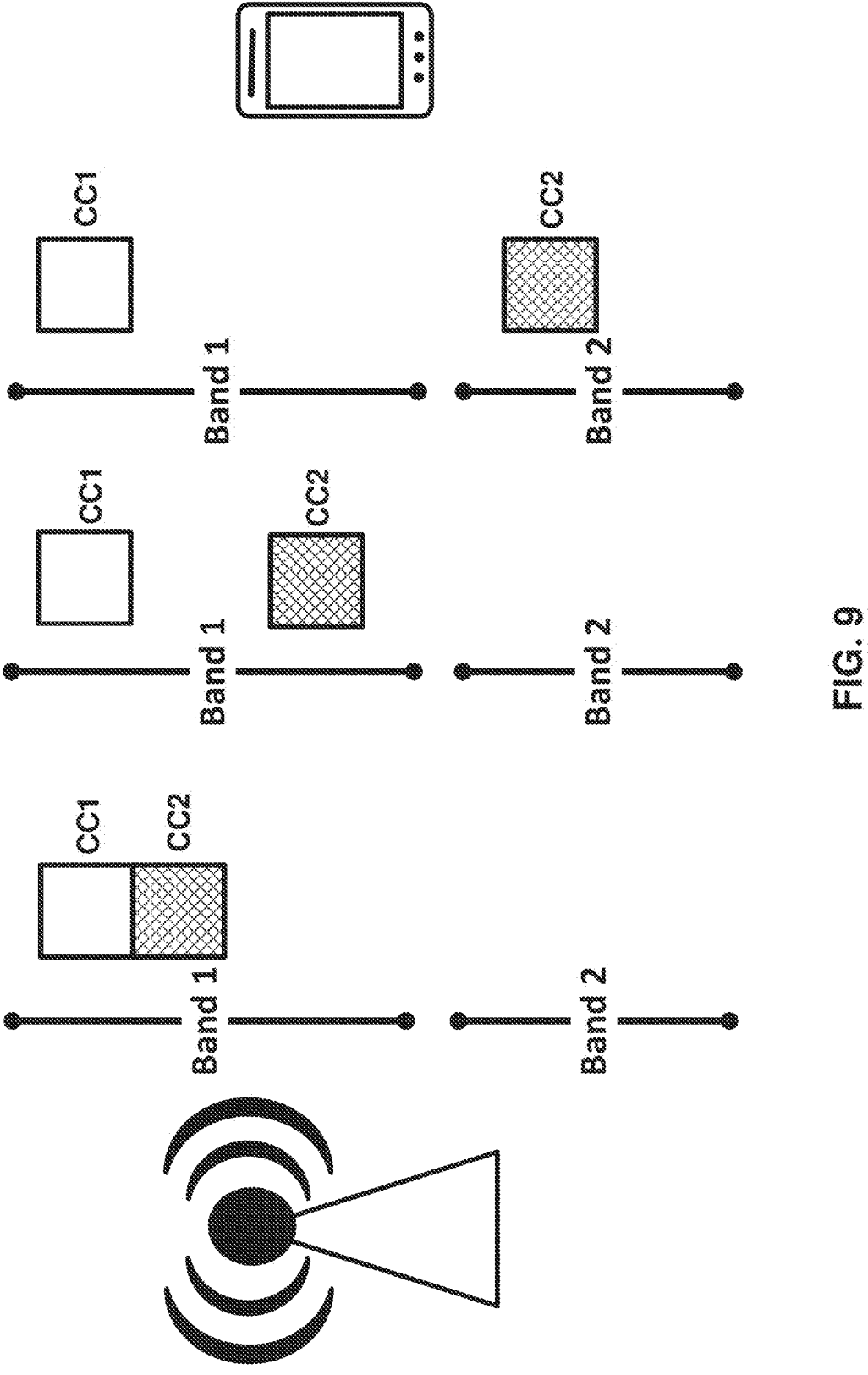

FIG. 9 shows example component carrier configurations in different carrier aggregation scenarios according to some aspects of some of various exemplary embodiments of the present disclosure.

Figure 10:
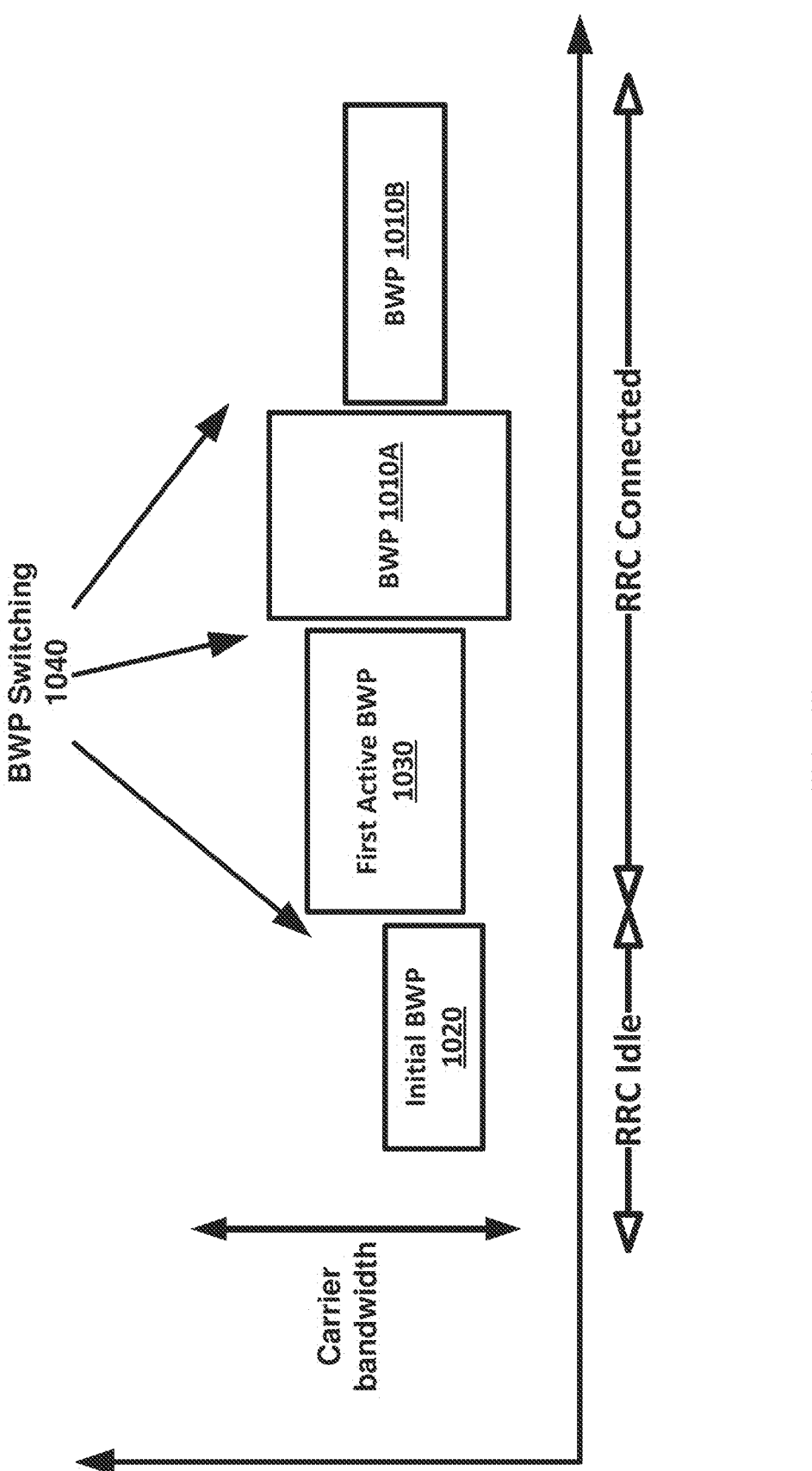

FIG. 10 shows example bandwidth part configuration and switching according to some aspects of some of various exemplary embodiments of the present disclosure.

Figure 11:
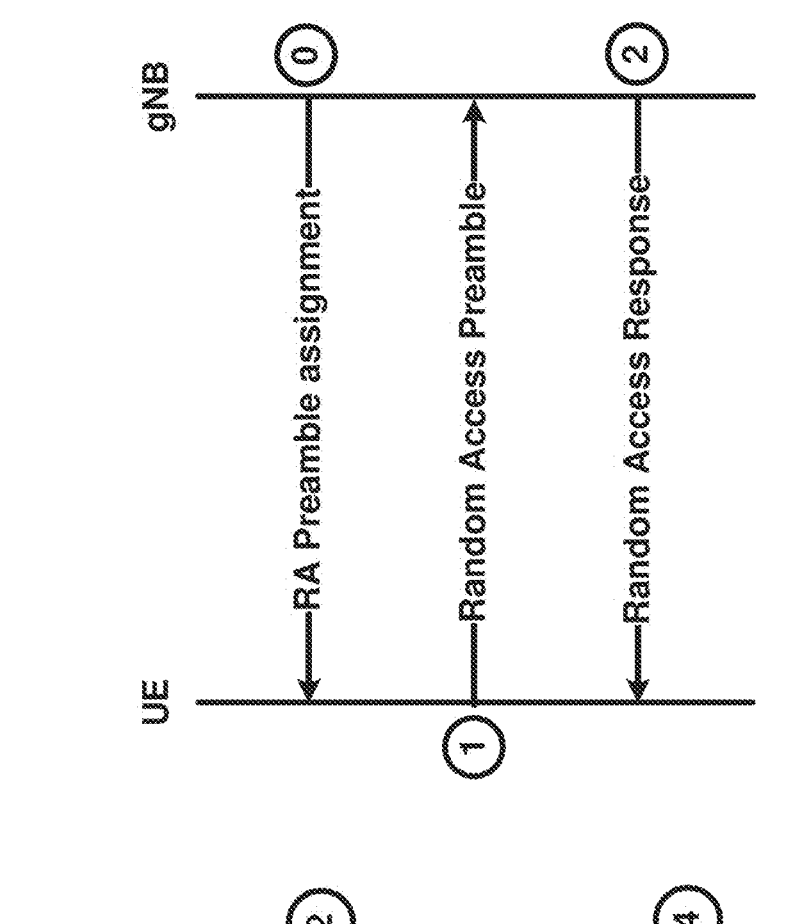
Figure 11:
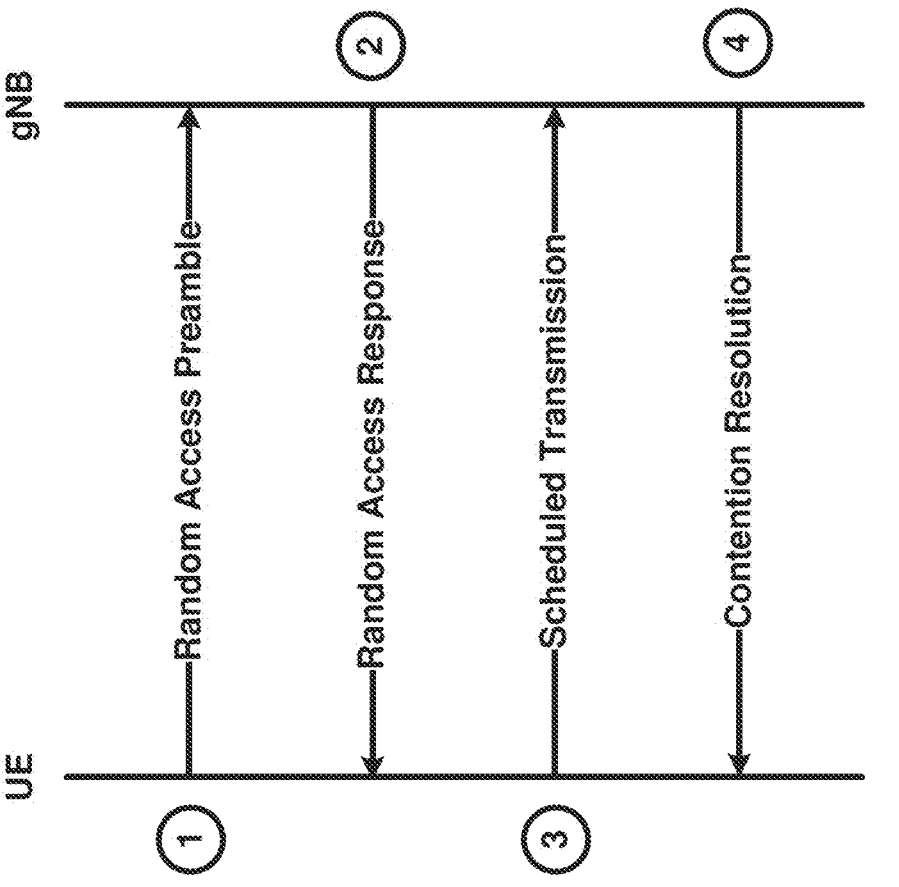

FIG. 11 shows example four-step contention-based and contention-free random access processes according to some aspects of some of various exemplary embodiments of the present disclosure.

Figure 12:
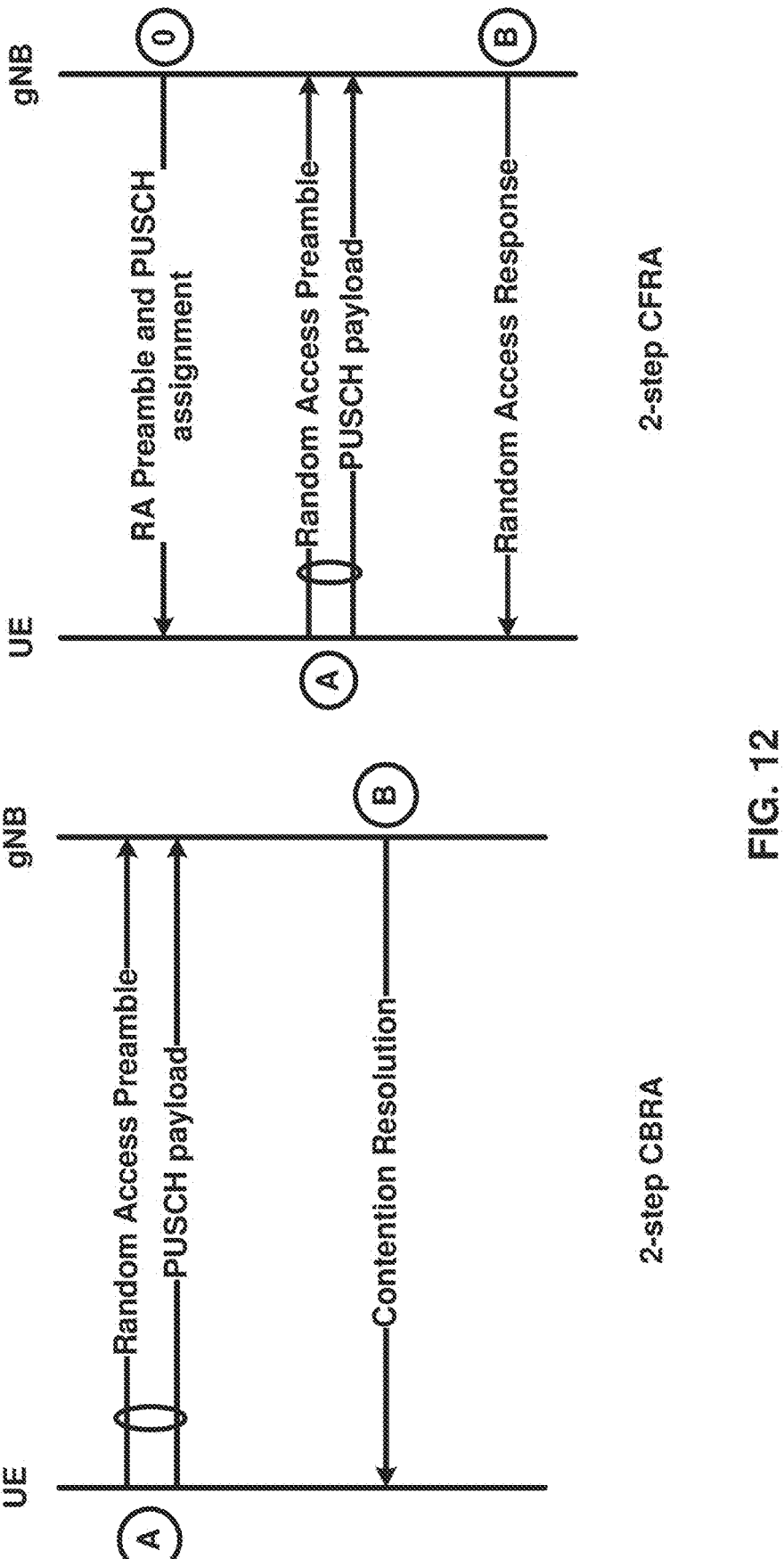

FIG. 12 shows example two-step contention-based and contention-free random access processes according to some aspects of some of various exemplary embodiments of the present disclosure.

Figure 13:
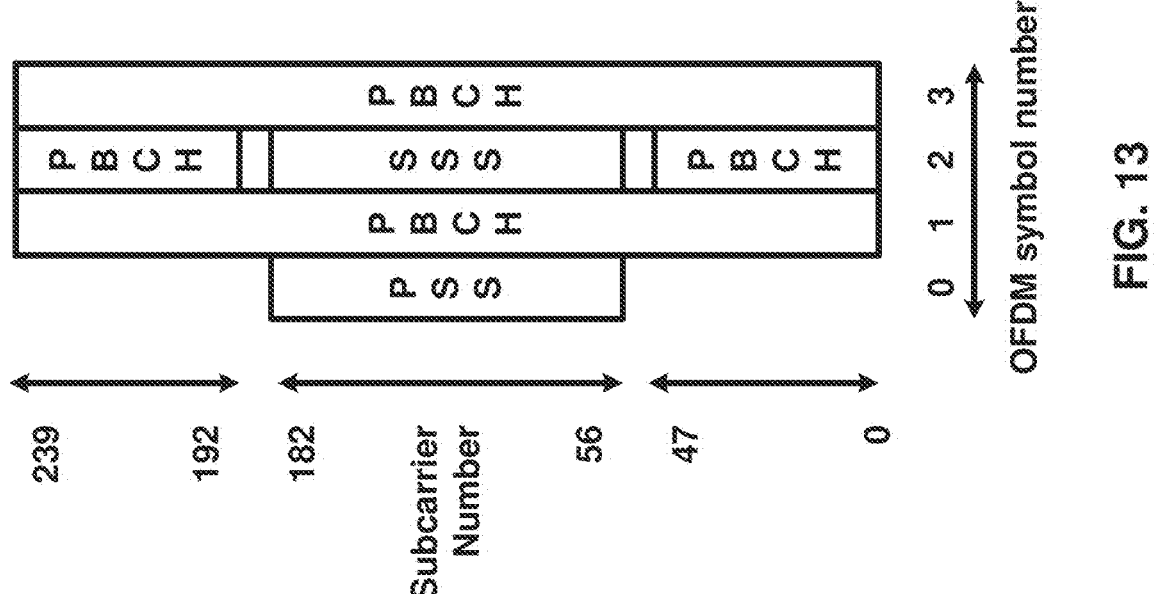

FIG. 13 shows example time and frequency structure of Synchronization Signal and Physical Broadcast Channel (PBCH) Block (SSB) according to some aspects of some of various exemplary embodiments of the present disclosure.

Figure 14:
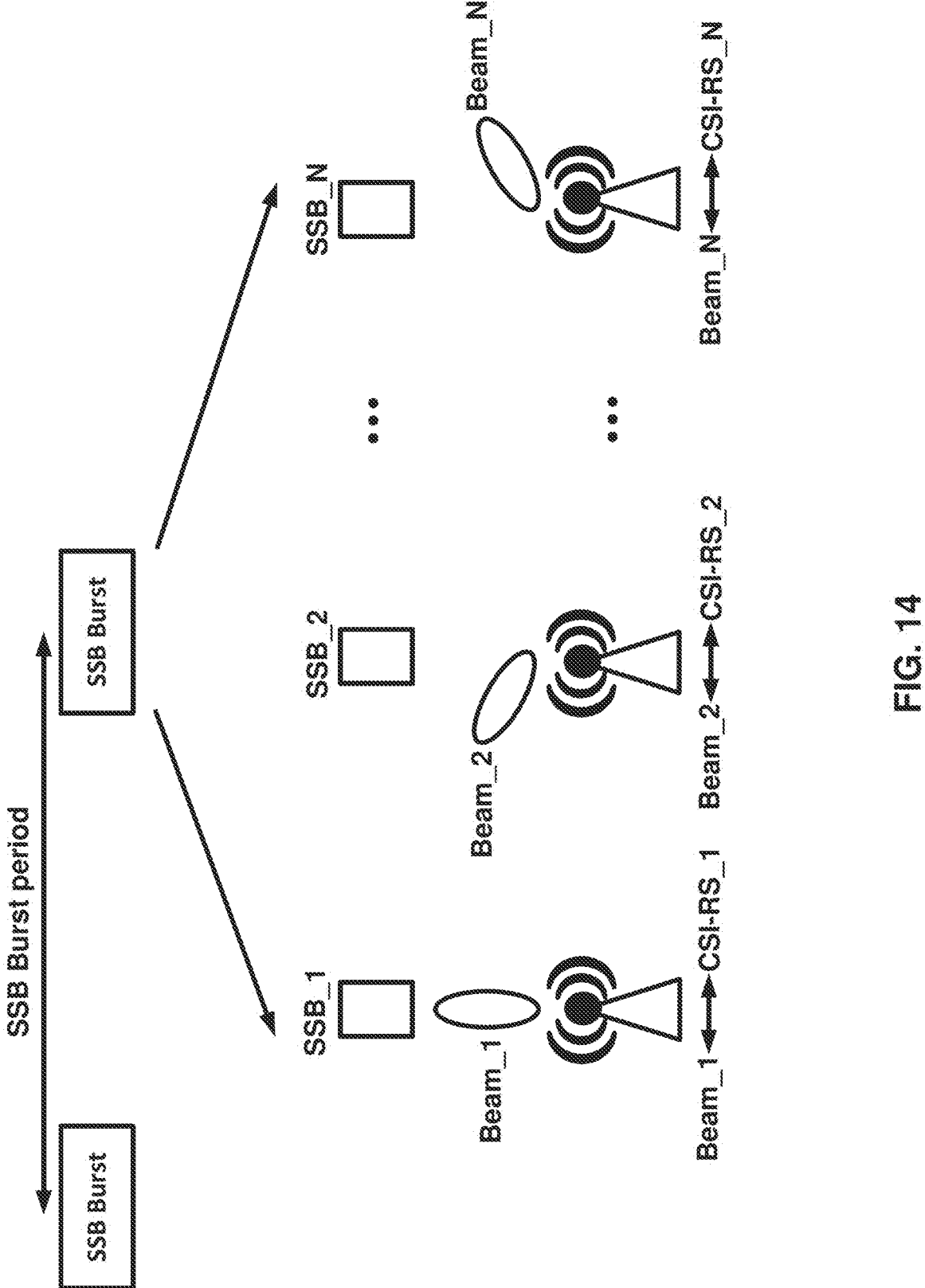

FIG. 14 shows example SSB burst transmissions according to some aspects of some of various exemplary embodiments of the present disclosure.

Figure 15:
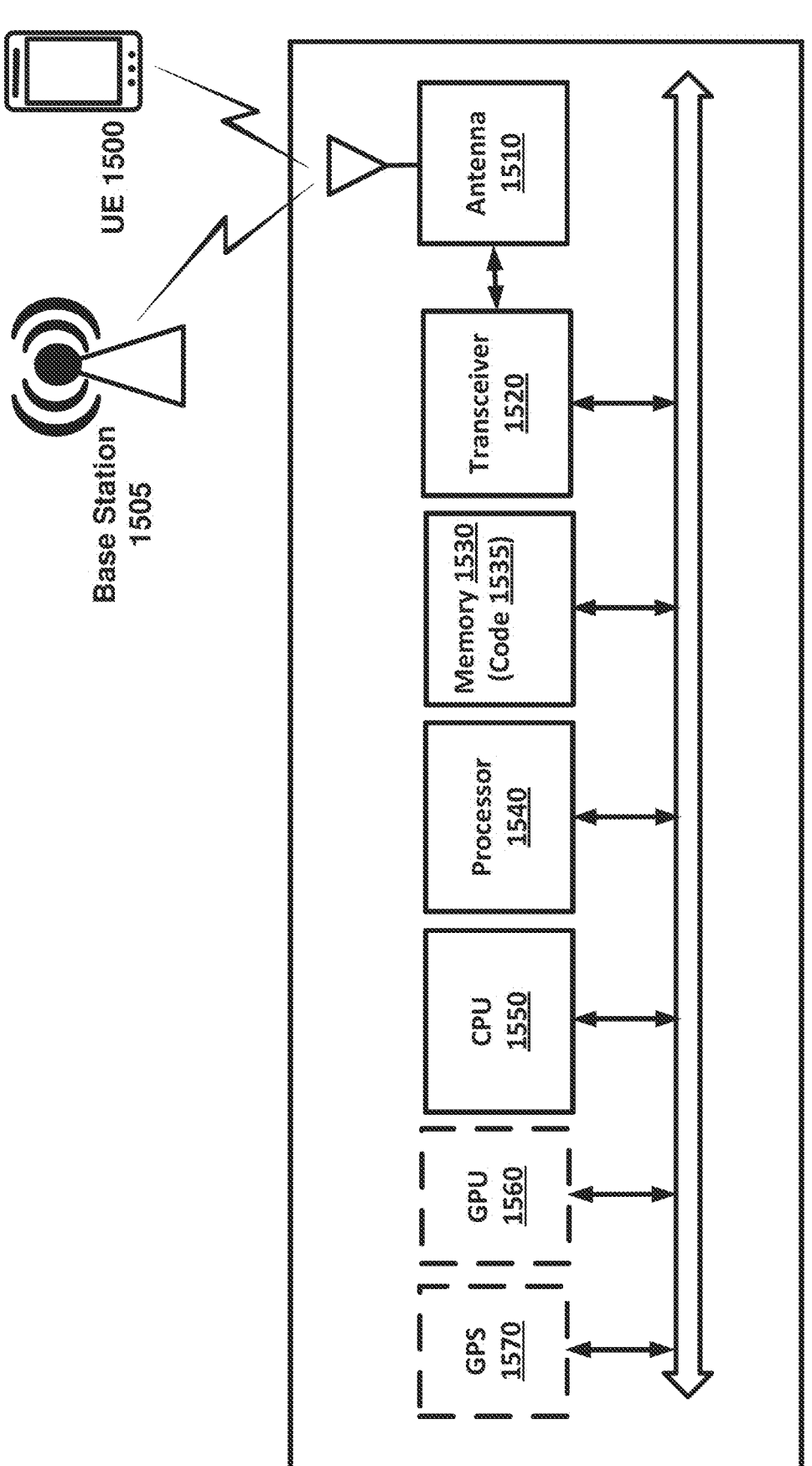

FIG. 15 shows example components of a user equipment and a base station for transmission and/or reception according to some aspects of some of various exemplary embodiments of the present disclosure.

Figure 16:
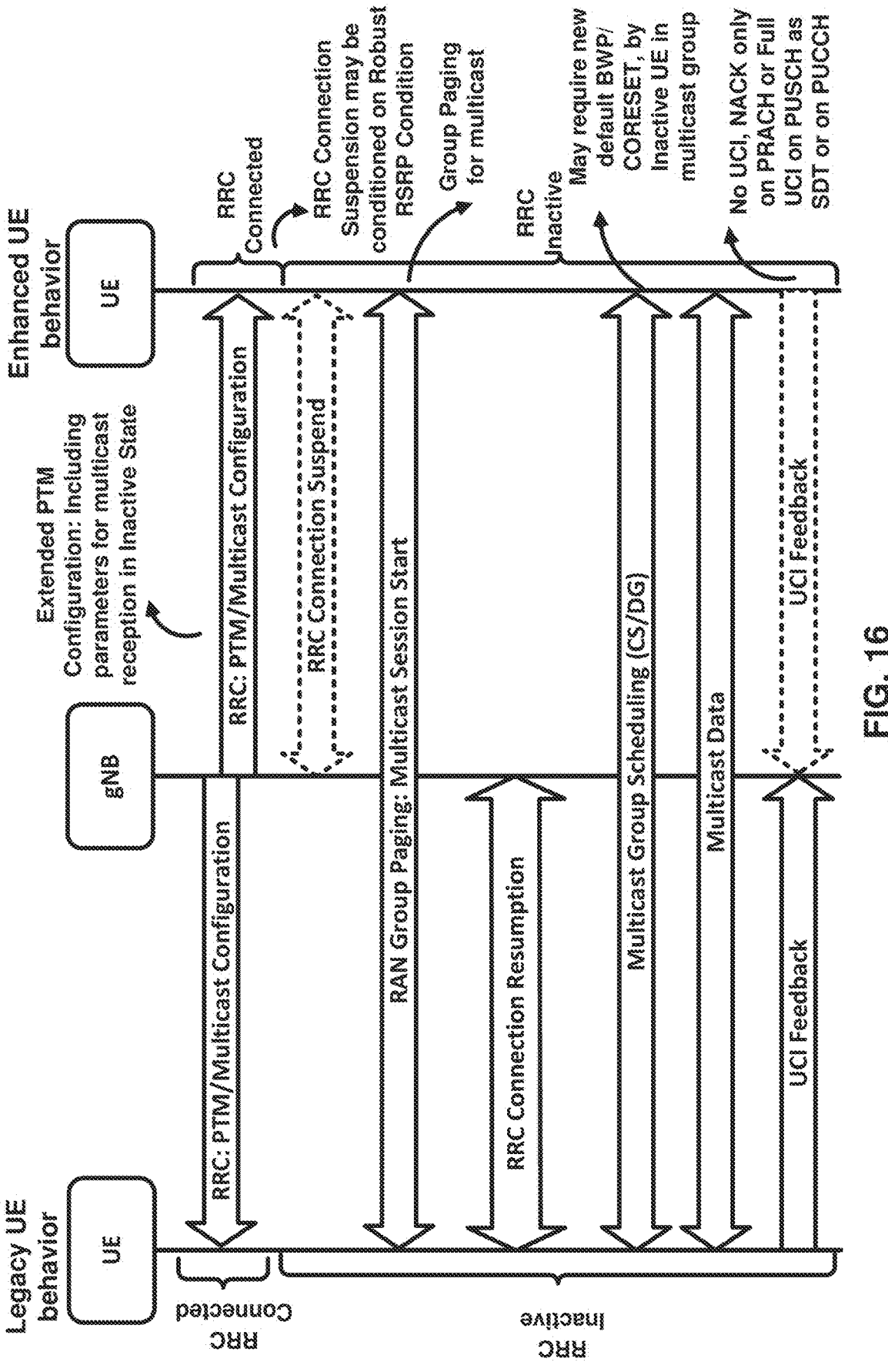

FIG. 16 shows example processes according to some aspects of some of various exemplary embodiments of the present disclosure.

Figure 17:
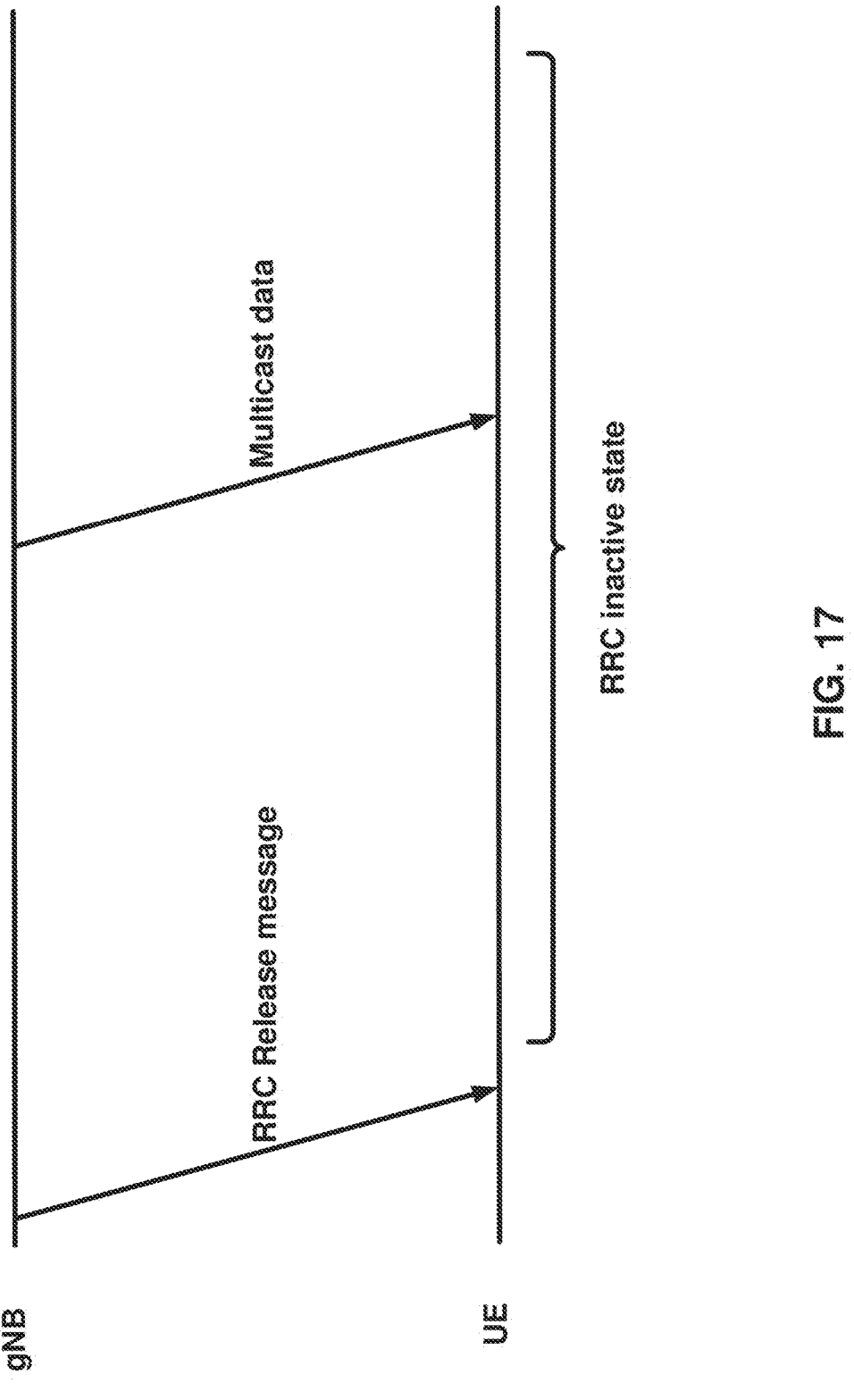

FIG. 17 shows an example process according to some aspects of some of various exemplary embodiments of the present disclosure.

Figure 18:
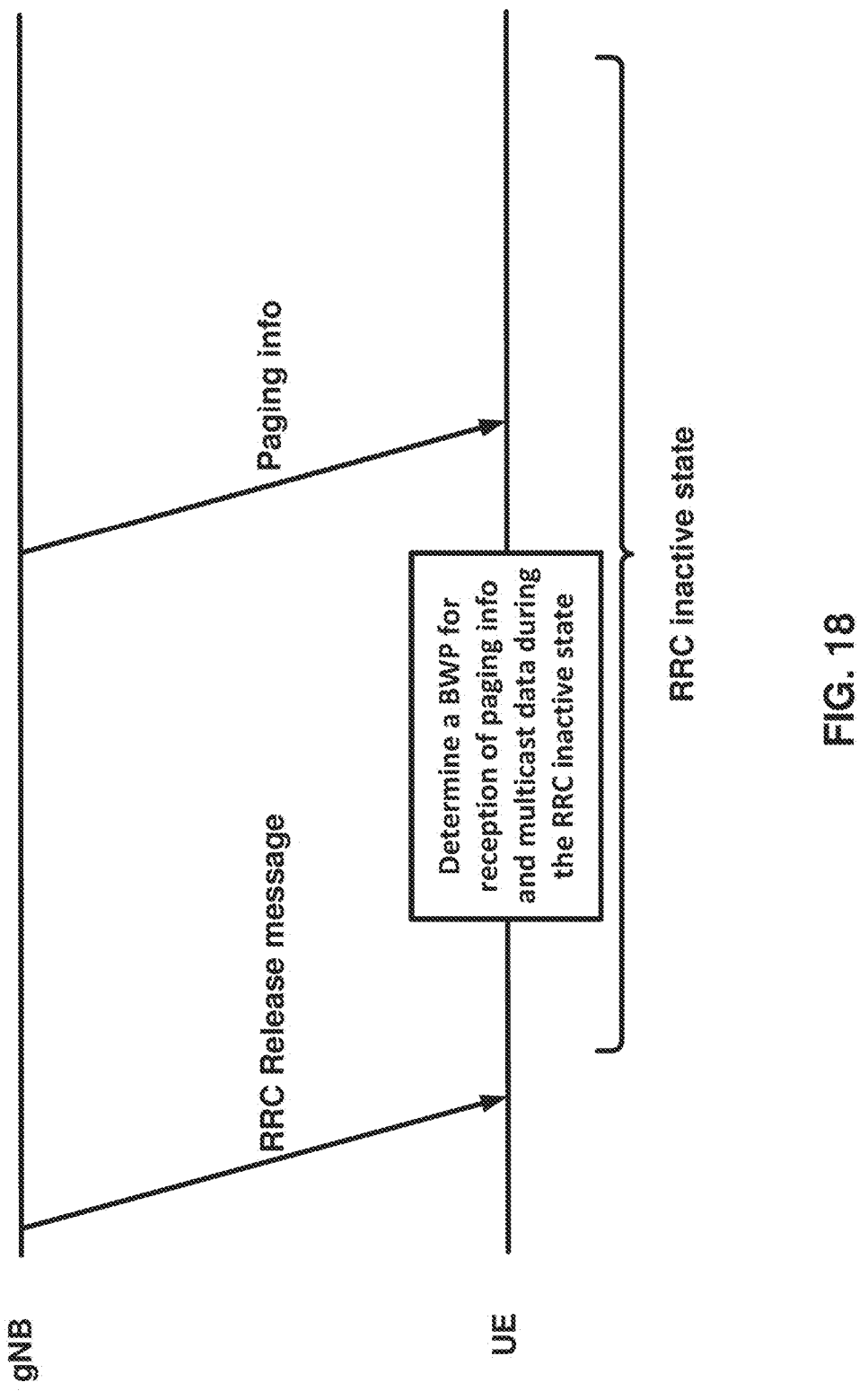

FIG. 18 shows an example process according to some aspects of some of various exemplary embodiments of the present disclosure.

Figure 19:
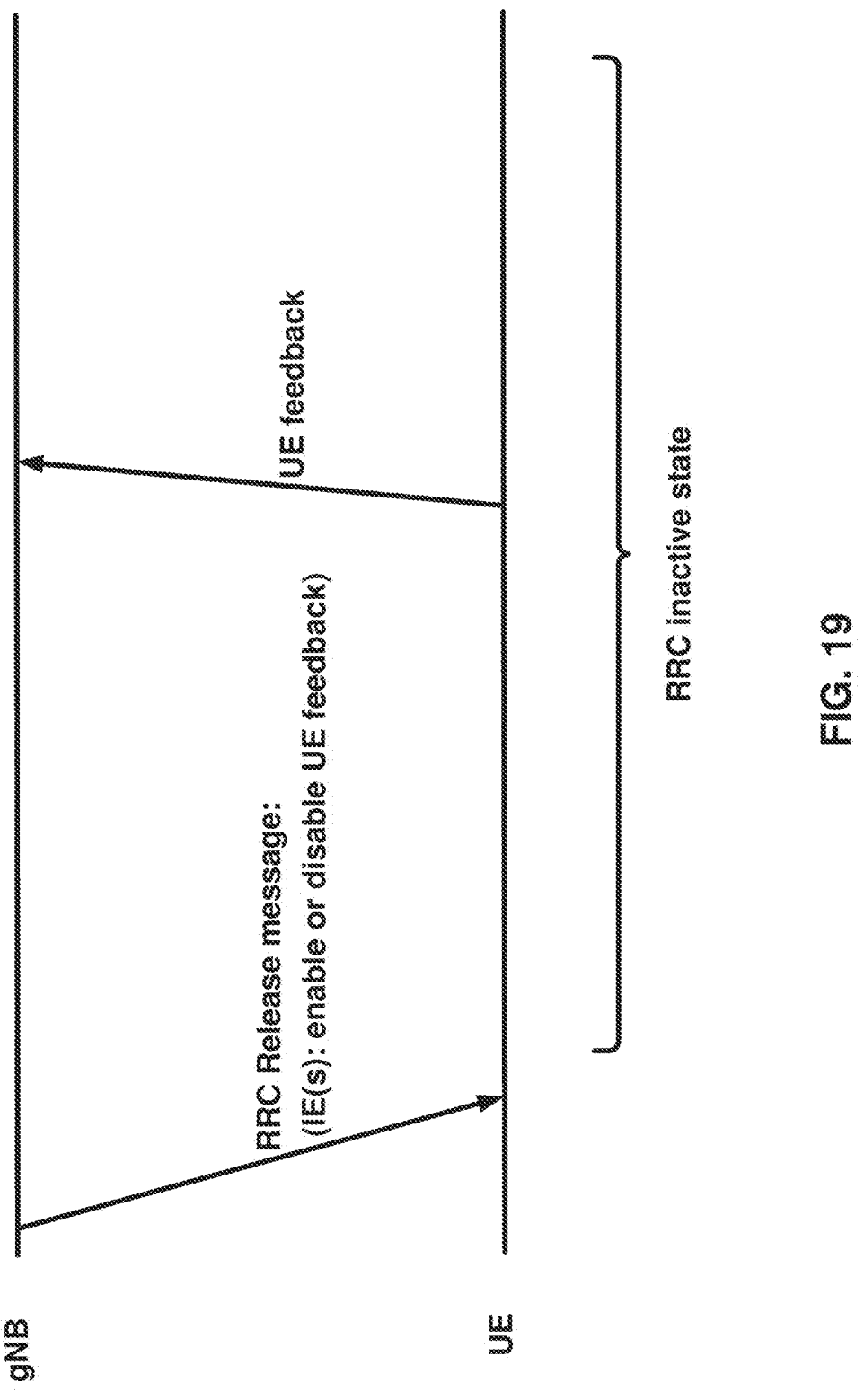

FIG. 19 shows an example process according to some aspects of some of various exemplary embodiments of the present disclosure.

Figure 20:
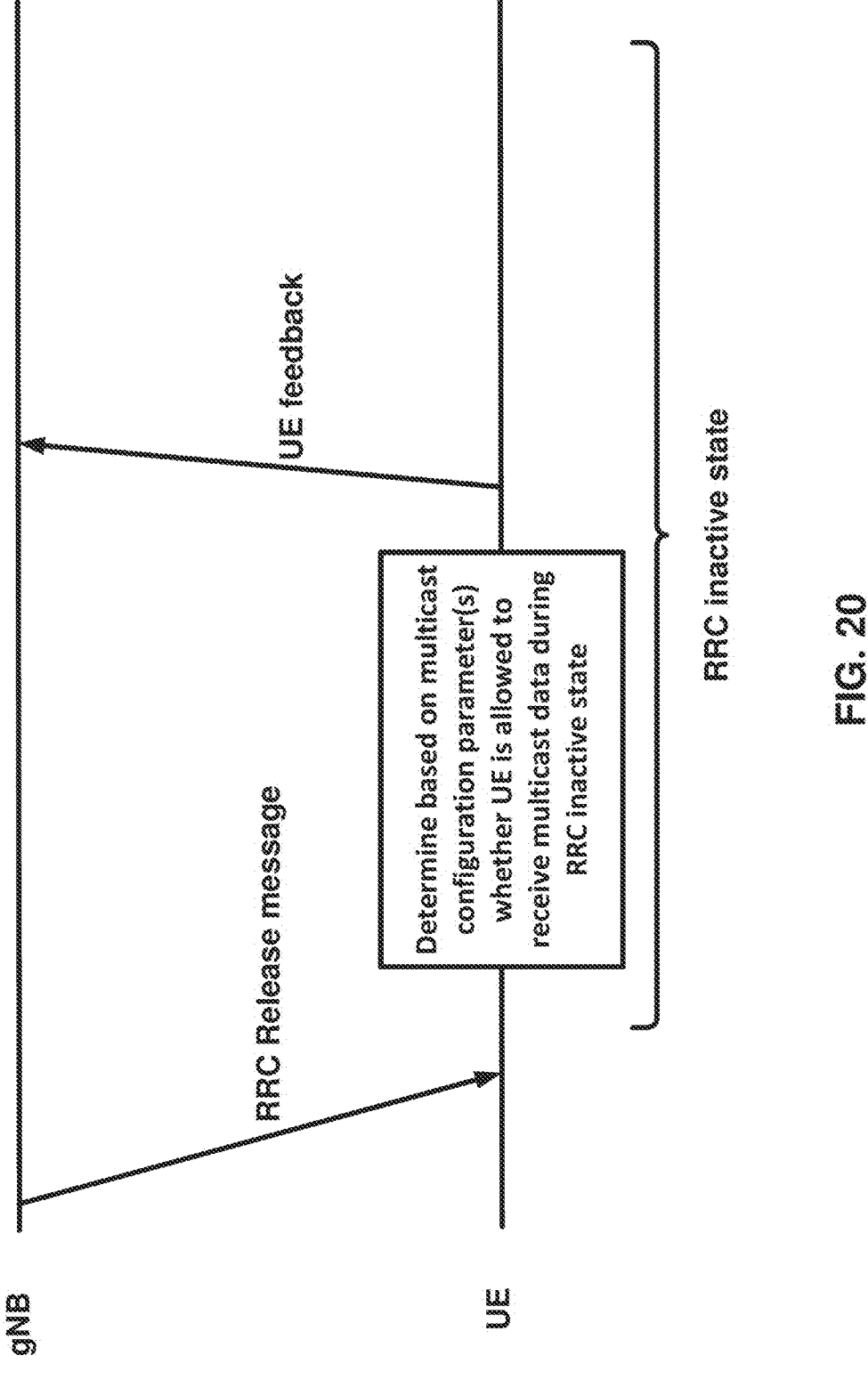

FIG. 20 shows an example process according to some aspects of some of various exemplary embodiments of the present disclosure.

DETAILED DESCRIPTION OF THE INVENTION

Figure 1:
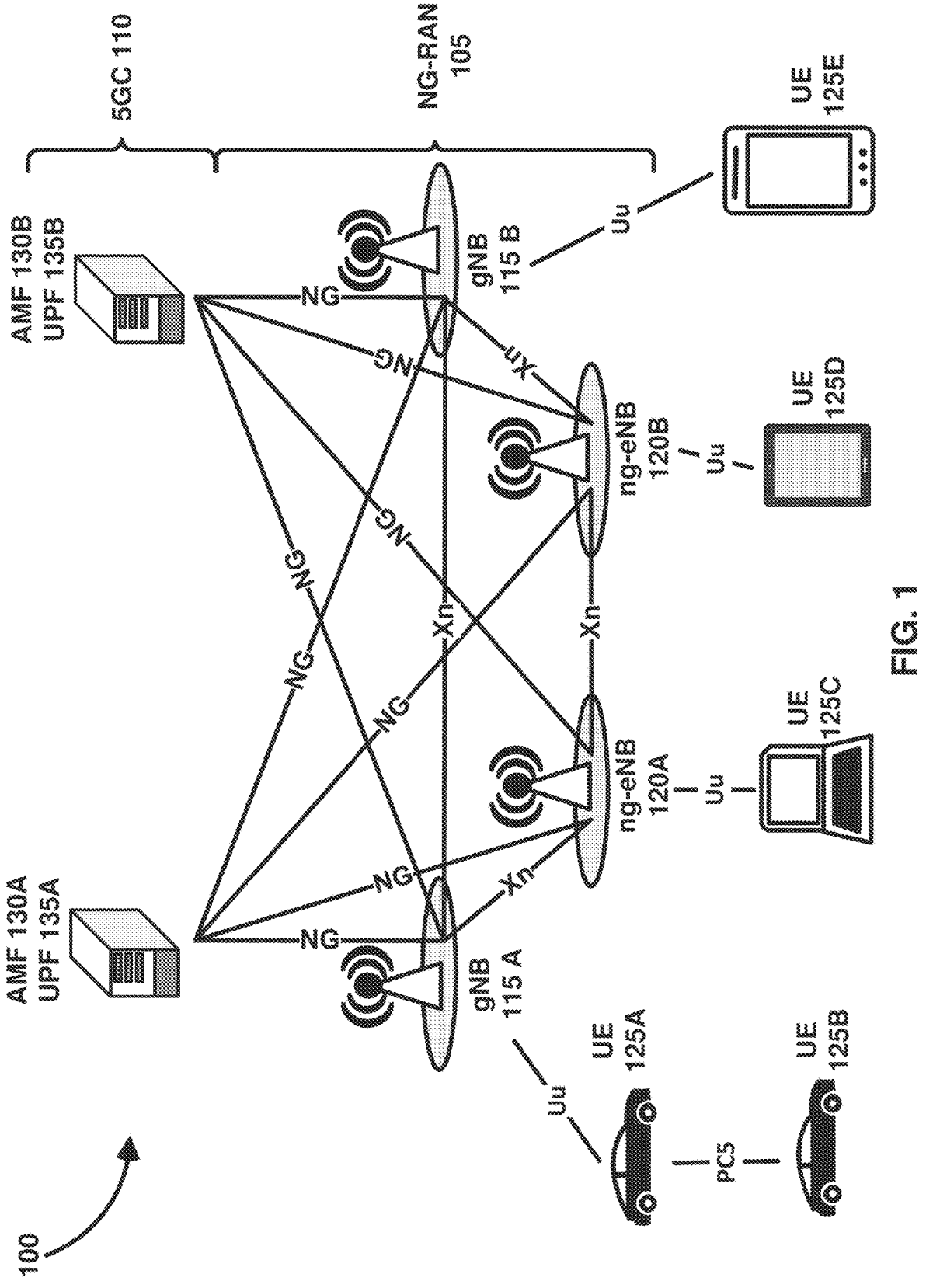
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol;

Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern (s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figures 5A, 5B, 5C, 5D:
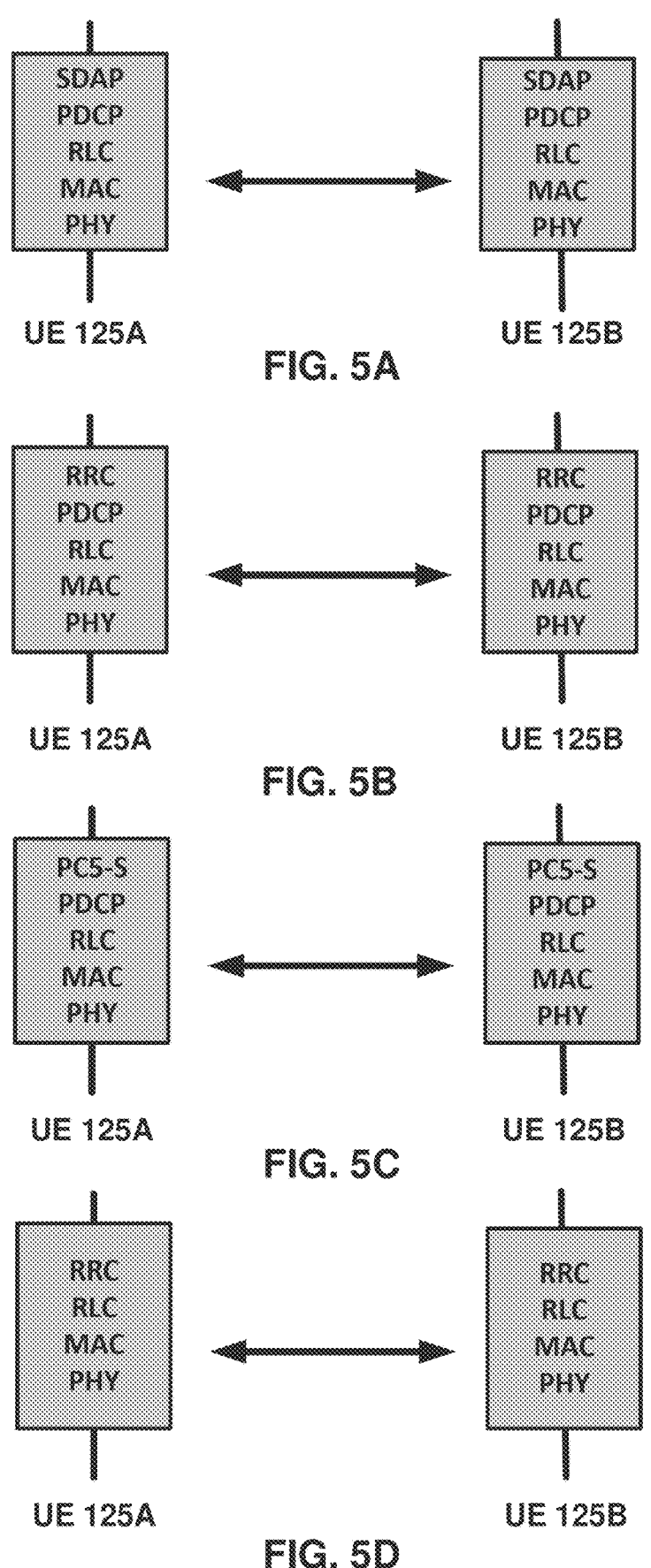

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend on the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as a timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

FIG. 15 shows example components of a user equipment and a base station for transmission and/or reception according to some aspects of some of various exemplary embodiments of the present disclosure. All or a subset of blocks and functions in FIG. 15 may be in the base station 1505 and the user equipment 1500 and may be performed by the user equipment 1500 and by the base station 1505. The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, paging may enable the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages may be addressed with P-RNTI on PDCCH, but while the former may be sent on PCCH, the latter may be sent over PDCCH directly.

In some examples, while in RRC_IDLE the UE may monitor the paging channels for CN-initiated paging. In some examples, in RRC_INACTIVE the UE may monitor paging channels for RAN-initiated paging. In some examples, a UE may not monitor paging channels continuously. Paging DRX may be defined where the UE in RRC_IDLE or RRC_INACTIVE may be required to monitor paging channels during one Paging Occasion (PO) per DRX cycle. The Paging DRX cycles may be configured by the network: 1) For CN-initiated paging, a default cycle may be broadcast in system information; 2) For CN-initiated paging, a UE specific cycle may be configured via NAS signaling; 3) For RAN-initiated paging, a UE-specific cycle may be configured via RRC signaling. The UE may use the shortest of the DRX cycles applicable i.e., a UE in RRC_IDLE may use the shortest of the first two cycles above, while a UE in RRC_INACTIVE may use the shortest of the three.

In some examples, the POs of a UE for CN-initiated and RAN-initiated paging may be based on the same UE ID, resulting in overlapping POs for both. The number of different POs in a DRX cycle may be configurable via system information and a network may distribute UEs to those POs based on their IDs.

In some examples, when in RRC_CONNECTED, the UE may monitor the paging channels in any PO signaled in system information for SI change indication and PWS notification. In case of bandwidth adaptation (BA), a UE in RRC_CONNECTED may monitor paging channels on the active BWP with common search space configured.

In some examples, for operation with shared spectrum channel access, a UE may be configured for an additional number of PDCCH monitoring occasions in its PO to monitor for paging. When the UE detects a PDCCH transmission within the UE's PO addressed with P-RNTI, the UE may not monitor the subsequent PDCCH monitoring occasions within this PO.

In some examples a paging procedure may be used to transmit paging information to a UE in RRC_IDLE or RRC_INACTIVE. The network may initiate the paging procedure by transmitting the Paging message at the UE's paging occasion. The network may address multiple UEs within a Paging message by including one PagingRecord for each UE.

In some examples, upon receiving the Paging message, if in RRC_IDLE, for each of the PagingRecord, if any, included in the Paging message: if the ue-Identity included in the PagingRecord matches the UE identity allocated by upper layers: the UE may forward the ue-Identity and accessType (if present) to the upper layers.

In some examples, upon receiving the Paging message, if in RRC_INACTIVE, for each of the PagingRecord, if any, included in the Paging message: if the UE is configured by upper layers with Access Identity 1: the UE may initiate the RRC connection resumption procedure with resumeCause set to mps-PriorityAccess; otherwise if the UE is configured by upper layers with Access Identity 2: the UE may initiate the RRC connection resumption procedure with resume-Cause set to mcs-PriorityAccess; otherwise if the UE is configured by upper layers with one or more Access Identities equal to 11-15: initiate the RRC connection resumption procedure with resumeCause set to highPriorityAccess. Otherwise, the UE may initiate the RRC connection resumption procedure with resumeCause set to mt-Access. In some examples, if the ue-Identity included in the PagingRecord matches the UE identity allocated by upper layers: the UE may forward the ue-Identity to upper layers and accessType (if present) to the upper layers.

In some examples, Short Messages can be transmitted on PDCCH using P-RNTI with or without associated Paging message using Short Message field in DCI format 1_0.

In some examples, the UE may use Discontinuous Reception (DRX) in RRC_IDLE and RRC_INACTIVE state in order to reduce power consumption. The UE may monitor one paging occasion (PO) per DRX cycle. A PO may be a set of PDCCH monitoring occasions and may consist of multiple time slots (e.g., subframe or OFDM symbol) where paging DCI may be sent. One Paging Frame (PF) may be one Radio Frame and may contain one or multiple PO(s) or starting point of a PO.

In some examples in multi-beam operations, the UE may assume that the same paging message and the same Short Message are repeated in transmitted beams and thus the selection of the beam(s) for the reception of the paging message and Short Message may be up to UE implementation. The paging message may be same for both RAN initiated paging and CN initiated paging.

In some examples, the UE may initiate RRC Connection Resume procedure upon receiving RAN initiated paging. If the UE receives a CN initiated paging in RRC_INACTIVE state, the UE may move to RRC_IDLE and informs NAS.

The PF and PO for paging may be determined by the following formulae: SFN for the PF is determined by: (SFN+PF_offset) mod T=(T div N)*(UE_ID mod N). Index (i_s), indicating the index of the PO may be determined by: i_s=floor (UE_ID/N) mod Ns.

The PDCCH monitoring occasions for paging may be determined according to pagingSearchSpace and firstPDCCH-MonitoringOccasionOfPO and nrofPDCCH-MonitoringOccasionPerSSB-InPO if configured. When SearchSpaceId=0 is configured for pagingSearchSpace, the PDCCH monitoring occasions for paging may be same as for RMSI.

In some examples, when SearchSpaceId=0 is configured for pagingSearchSpace, Ns may be either 1 or 2. For Ns=1, there may be one PO which may start from the first PDCCH monitoring occasion for paging in the PF. For Ns=2, PO may be either in the first half frame (i_s=0) or the second half frame (i_s=1) of the PF.

When SearchSpaceId other than 0 is configured for pagingSearchSpace, the UE may monitor the (i_s+1)th PO. A PO may be a set of 'S*X' consecutive PDCCH monitoring occasions where 'S' is the number of actual transmitted SSBs determined according to ssb-PositionsInBurst in SIB1 and X may be the nrofPDCCH-MonitoringOccasion-PerSSB-InPO if configured or may be equal to 1 otherwise. The [x*S+K]th PDCCH monitoring occasion for paging in the PO may correspond to the Kth transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) may be sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it may be equal to i_s*S*X. If X>1, when the UE detects a PDCCH transmission addressed to P-RNTI within its PO, the UE may not be required to monitor the subsequent PDCCH monitoring occasions for this PO.

In some examples, a PO associated with a PF may start in the PF or after the PF.

In some examples, the PDCCH monitoring occasions for a PO may span multiple radio frames. When SearchSpaceId other than 0 is configured for paging-SearchSpace the PDCCH monitoring occasions for a PO may span multiple periods of the paging search space.

The following parameters are used for the calculation of PF and i_s above: T: DRX cycle of the UE (T may be determined by the shortest of the UE specific DRX value(s), if configured by RRC and/or upper layers, and a default DRX value broadcast in system information. In RRC_IDLE state, if UE specific DRX is not configured by upper layers, the default value may be applied); N: number of total paging frames in T. Ns: number of paging occasions for a PF; PF_offset: offset used for PF determination; UE_ID: 5G-S-TMSI mod 1024.

In some examples, parameters Ns, nAndPagingFrameOffset, nrofPDCCH-MonitoringOccasionPerSSB-InPO, and the length of default DRX Cycle may be signaled in SIB1. The values of N and PF_offset may be derived from the parameter nAndPagingFrameOffset. The parameter first-PDCCH-MonitoringOccasionOfPO may be signaled in SIB1 for paging in initial DL BWP. For paging in a DL BWP other than the initial DL BWP, the parameter first-PDCCH-MonitoringOccasionOfPO may be signaled in the corresponding BWP configuration.

In some examples if the UE has no 5G-S-TMSI, for instance when the UE has not yet registered onto the network, the UE may use as default identity UE_ID=0 in the PF and i_s formulas above.

In some examples, 5G-S-TMSI may be a 48 bit long bit string. 5G-S-TMSI may in the formulae above be interpreted as a binary number where the left most bit represents the most significant bit.

In some examples, the RRCRelease message may be used to command the release of an RRC connection or the suspension of the RRC connection. A field/IE suspendConfig may indicate configuration for the RRC_INACTIVE state. The network may not configure suspendConfig when the network redirect the UE to an inter-RAT carrier frequency or if the UE is configured with a DAPS bearer. The suspendConfig field/IEmay comprise a fullI-RNTI parameter, a shortI-RNTI parameter, a ran-PagingCycle parameter, a ran-NotificationAreaInfo parameter, a t380 timer parameter and a nextHopChainingCount parameter. Network may ensure that the UE in RRC_INACTIVE always has a valid ran-NotificationAreaInfo. A ran-PagingCycle parameter may refer to the UE specific cycle for RAN-initiated paging. A t380 parameter may refer to the timer that triggers the periodic RNAU procedure in UE.

In example embodiments, different multicast broadcast services (MBS) delivery modes, e.g., MBS multicast and MBS broadcast, for services of PTM (Point-To-Multipoint) nature may be used. There may be important use cases for which broadcast/multicast could provide substantial benefits, especially in terms of system efficiency and user experience. The use cases include but are not limited to public safety and mission critical, V2X applications, IPTV, live video, software delivery over wireless and IoT applications. The delivery mode of MBS multicast may be capable of addressing higher QoS services while the delivery mode MBS broadcast is focusing on lower QoS services.

In example embodiments, MBS multicast may provide the MBS delivery mode for RRC_CONNECTED mode UEs.

In some examples, MBS multicast may use group scheduling. A common frequency resource (CFR) may be defined for multicast scheduling as an 'MBS frequency region' with a number of contiguous PRBs, which may be configured within the dedicated unicast BWP. A group of UEs may be configured via RRC signaling with a G-RNTI for group scheduling, and the group of UEs may also be configured with downlink SPS and G-CS-RNTI for MBS multicast. The gNB may schedule a transport block using G-RNTI (or G-CS-RNTI) to the group of UEs.

In some examples, HARQ feedback may be used to further improve the group scheduling efficiency, and the following two HARQ feedback reporting modes may be supported. In a first HARQ feedback reporting mode, the UE may transmit a PUCCH with HARQ-ACK information if the UE has correctly received the transport block or HARQ-NACK value if the UE has not correctly received the transport block. For a second HARQ feedback reporting mode, the UE may transmit a PUCCH with HARQ-NACK information only if the UE has not correctly received the transport block.

In some examples, HARQ reporting for multicast may also be disabled for a UE either semi-statically or dynamically.

In some examples, dynamic PTP (Point-To-Point)/PTM switch may be enabled for MBS multicast. The PTP-PTM switching function may be applicable for MBS multicast delivery mode. It may not always be efficient for gNB to schedule data based on G-RNTI (PTM), and sometimes PTP based scheduling (same as unicast) may bring more benefits thanks to the advanced unicast mechanisms. Based on the common PDCP entity, the gNB may decide for an MBS multicast session to use PTM or PTP to deliver data to the UE(s). The gNB may make its decision based on information such as MBS Session QoS requirements, the number of jointly scheduled UEs, UE feedback on link quality, and other criteria. Regardless of the decision of PTP or PTM, the gNB may ensure the same QoS requirements to be met for the service.

In some examples, MBS broadcast may provide the downlink only MBS delivery mode for UE in all RRC states, addressing lower QoS services.

In example embodiments, group scheduling may be enabled for MBS broadcast.

In some examples, a common frequency resource (CFR) may be defined for broadcast scheduling as an 'MBS frequency region' with a number of contiguous PRBs in which G-RNTI may be used to schedule the associated MBS broadcast service. The bandwidth of CFR may be equal to or larger than initial BWP, which may be indicated by system information. HARQ feedback and HARQ re-transmission may not be supported for MBS broadcast.

In some examples, for MBS broadcast Configuration, the UE may receive the MBS configuration for a broadcast service via a broadcast control channel, i.e., MCCH, which may be the same for UEs in RRC_IDLE, RRC_INACTIVE and RRC_CONNECTED states.

The multicast service delivery for UEs in RRC_CONNECTED state only, may not adequately fulfil the requirements of some use cases such as Mission Critical Services and IOT application, especially for cells with a large number of UEs. Also, to always keep UEs in RRC_CONNECTED state may not be power efficient. It is therefore important to support multicast for UEs in RRC_INACTIVE.

Example embodiments may enable multicast reception by UEs in RRC_INACTIVE state. Example embodiments may enable PTM configuration for UEs receiving multicast in RRC_INACTIVE state.

In legacy processes, MBS procedures may be defined for UEs to receive Point to Multipoint (PTM) configuration and data for multicast services only in RRC connected state. Such UEs may go into inactive state for power saving when there is no multicast data scheduled or when multicast session is inactive and may return in RRC connected through group paging before start or resumption of multicast data transmission in the downlink.

Example embodiments may enhance to support PTM configuration and multicast services reception of for UEs in RRC_INACTIVE state. Example embodiments may extend the configuration parameters and signaling framework that is defined for multicasting for RRC Connected state UEs.

For UEs in inactive state to receive multicast data without moving to RRC Connected state, example embodiments enhance Multicast Group Joining and Radio Configuration; Group Notification and for Multicast Session Start/Change; Receiving Dynamic and Configured Multicast Scheduling Information and Data; and Providing uplink CSI and HARQ feedback for multicast data. Example enhancements are shown in FIG. 16.

In some examples, for Multicast Group Joining and Radio Configuration, for initializing the PTM configuration or Multicast Service for UEs in Inactive state, UE may receive multicast data in Inactive state but may join the multicast group and receive multicast configuration UE needs to move RRC connected state.

In some examples, for Multicast Group Joining and Radio Configuration, for initializing the PTM configuration or Multicast Service for UEs in Inactive state, UEs in Inactive state may send a request to join a multicast group and receive the multicast configuration without transitioning to RRC connected state, e.g. random access (RA) or configured grant (CG) based Small Data Transmission (SDT) if configured by the cell.

In some examples, for receiving Dynamic and Configured Multicast Scheduling Information: dynamic and configured scheduling (DG/CG) of PDSCH carrying multicast data may involve PDCCH transmissions in a common CORESET and common frequency resource (CFR) that is part of active BWPs for all RRC Connected UEs in the multicast group so that they all receive the same allocation signaling and data. For RRC connected state UEs the active BWP may be configured by gNB such that UEs' unicast and multicast services can be delivered with no conflict and preferably no BWP switching.

In example embodiments, the Inactive UEs may be able to receive the same multicast scheduling information that is received by RRC connected UEs.

In some examples, each UE in Inactive state in legacy processes may only monitor its default BWP/CORESET for any incoming paging and common control signaling. If the default BWP for such UE does not contain the common frequency resource, BWP and CORESET where multicast related PDCCH/PDSCH are transmitted, such inactive UE may not be able to receive multicast scheduling info and data. To address this issue, one may consider setting the default BWP and CORESET for all inactive state UE which are part of multicast group to be the same that is used for RRC connected state UEs. Alternatively, the UEs may use their default BWP normally but switch to the common MBS BWP/CFR/CORESET only during an active multicast session. In this context the multicast session active time is determined based on start and end timers which may be included in notification signaling from gNB. While BWP switching in RRC connected state is challenging such switching in inactive state may be feasible.

In some examples, one of the multiple alternatives may be considered, as configured by gNB and be used, for Inactive UEs for downlink signaling monitoring to ensure their reception of multicast resource scheduling information.

In some examples, the Inactive UEs who join a multicast group for an MBS service may use the target MBS's common BWP/CFR and CORESET as their default BWP to monitor for normal paging and other downlink control signal monitoring.

In some examples, the Inactive UEs who join a multicast group for an MBS service may continue using their regular default BWP but may switch to target MBS's common BWP/CFR and CORESET as their default BWP only such MBS multicast session is active.

In example embodiments, for providing uplink CSI and HARQ feedback for multicast data, UEs' Uplink Control Information (UCI) feedback to support downlink multicast services may be needed based on service reliability and to improve transmission efficiency. The cost benefit tradeoff for such uplink feedback may depend on the number of users in and their geographical distribution within a cell or network. In some examples, NAK based feedback may be more efficient to limit feedback overhead when number of users are larger. UEs in RRC connected state may also be configured to send CSI feedback to help with more optimized multicast transmission.

In some examples, depending on the use cases, number of UEs in multicast group and their mixed services there would be scenarios in which most or all UEs in the multicast group are in Inactive state when UCI feedback is needed. In such scenarios the network may need to tap into UCI feedback from Inactive state.

In some examples, UCI feedback from UEs in Inactive state may be enabled or disabled by the gNB, e.g., based on number of UEs in multicast group which are RRC Connected and providing the UCI.

In some examples, Robust RSRP Condition may be an RRC configurable condition setting which may include a minimum RSRP level and timer over which RSRP stays above that level.

In some examples, UCI feedback for multicast from UEs in Inactive state may not be provided but only UEs with Robust RSRP conditions may be allowed to receive multicast data while in inactive state. In some examples, multicast configuration may include Robust RSRP conditions, e.g., threshold and/or timers, for UEs to be allowed to receive multicast in inactive state. In some examples, inactive UEs involved in an active multicast session may resume their RRC connection to receive the service data if their Robust RSRP condition is not met.

In some examples, UEs in inactive state may send some form of UCI signaling. Such transmission may use PUSCH and/or PUCCH resources and/or PRACH. The network may use the Robust RSRP condition as a criterion to allow such UCI feedback.

In some examples, UE receiving multicast data in inactive state may be configured not to transmit UCI if their Robust RSRP condition is met.

In some examples, UCI feedback from UE in inactive state may be limited to simple HARQ feedback. Such binary indications may be transmitted using as set of configured PRACH preambles. This approach may be further simplified to limit such feedback to NAK only. In cases where retransmissions are unicast the PRACH resources may configured for each UE otherwise a common pool of PRACH resources may be used to indicate NAKs followed by multicast retransmission.

In some examples, UEs in Inactive state may be configured as part of PTM configuration or scheduling to send their HARQ feedback using a preamble provided by the network. Each UE in inactive state may be configured with a PARCH resources, e.g., preambles, to indicates its HARQ NAK only transmissions. In some examples, UEs in Inactive state may be configured with a common pool of PRACH resources, e.g., preambles, to indicate their HARQ NAK only transmissions.

In some examples, small data transmission (SDT) may allow UEs in Inactive state to send small data packets on PUSCH in the uplink using a Random Access (RA) or Configured Grant (CG) based resource. In some examples, SDT in inactive state may be used to send UCI on such PUSCHs even when there is no data. SDT transmission in the uplink may be subject to small data size and some RSRP thresholds and timing advanced timer (TAT) checks.

In some examples, UEs in Inactive state may be configured to send their UCI feedback on a PUSCH reusing RA or CG based SDT frameworks and configuration.

In some examples, UEs in Inactive state may be configured with a PUCCH resource which may be used while in Inactive state. This PUCCH resource may be one of those configured for UE in RRC connected state but may be extended to be used also in Inactive state as determined by the network.

In some examples, a UE in multicast group may be configured with a PUCCH resource, e.g., as part of PTM configuration, to use for UCI transmission if the UE transitions to inactive state while receiving multicast data.

In some examples, when NAK only on a common PUCCH is preferred, the PUCCH resource configuration for inactive state UEs may also be shared by multiple UEs.

Existing multicast data transmission processes enable multicast data (e.g., using point to multi-point (PTM) configurations) during the RRC connected state and a UE in an RRC inactive state may transition to the RRC connected state to receive the multicast data. There are use cases that require multicast data reception during the RRC inactive state without a state transition. There is a need to enhance the existing multicast processes for multicast service/data delivery during the RRC inactive state. Example embodiments enhance the existing multicast processes for multicast service/data delivery during the RRC inactive state.

In example embodiments, a UE, while operating in an RRC connected state, may receive an RRC release message indicating transitioning of the wireless device from the RRC connected state to an RRC inactive state. The RRC release message (e.g., a suspend config IE included in the RRC release message) may comprise configuration parameters for wireless device operation during the RRC inactive state. For example, the RRC release message (e.g., the suspend config IE of the RRC release message) may comprise configuration parameters for small data transmission (SDT) (e.g., mobile terminated SDT (MT-SDT) or mobile originated SDT (MO-SDT)) during the RRC inactive state. For example, the RRC release message (e.g., the suspend config IE of the RRC release message) may comprise semi-persistent scheduling (SPS) configuration parameters of one or more SPS configurations during the RRC inactive state. For example, the RRC release message (e.g., the suspend config IE of the RRC release message) may comprise configured grant configuration parameters of one or more configured grant configurations during the RRC inactive state. For example, the RRC release message (e.g., the suspend config IE of the RRC release message) may comprise random access configuration parameters for random access processes during the RRC inactive state.

In example embodiments, a UE may be interested in receiving multicast data during the RRC inactive state. The UE may join one or more multicast groups and may receive multicast configuration parameters for receiving multicast data (e.g., associated with the one or more multicast groups) during the RRC inactive state. In some examples, the UE may join the one or more multicast groups before receiving the RRC release message and/or before transitioning to the RRC inactive state. In some examples, the UE may join the one or more multicast groups after receiving the RRC release message and/or after transitioning to the RRC inactive state. In some examples, the UE may receive the multicast configuration parameters before receiving the RRC release message and/or before transitioning to the RRC inactive state. In some examples, the UE may receive the multicast configuration parameters after receiving the RRC release message and/or after transitioning to the RRC inactive state.

In an example embodiment as shown in FIG. 17, while in the RRC inactive state, the UE may receive multicast data in response to joining one or more multicast groups and receiving multicast configuration parameters, e.g., multicast configuration parameters associated with the one or more multicast groups.

In some examples, the UE may join the one or more multicast groups while in the RRC connected state and before receiving the RRC release message and/or before transitioning to the RRC inactive state. In some examples, the UE may receive the multicast configuration parameters while in the RRC connected state before receiving the RRC release message and/or before transitioning to the RRC inactive state. In some examples, the multicast configuration parameters, received during the RRC connected state, may comprise first multicast configuration parameters for multicast data reception during the RRC connected state and second multicast configuration parameters for multicast data reception during the RRC inactive state.

In some examples, the UE may join the one or more multicast groups after receiving the RRC release message and/or after transitioning to the RRC inactive state. In some examples, the UE may receive the multicast configuration parameters after receiving the RRC release message and/or after transitioning to the RRC inactive state.

In some examples, the UE may join the one or more multicast groups while in the RRC connected state and before receiving the RRC release message and/or before transitioning to the RRC inactive state. In some examples, the UE may receive the multicast configuration parameters after receiving the RRC release message and/or after transitioning to the RRC inactive state.

In some examples, the UE may join the one or more multicast groups (e.g., after transitioning to the RRC inactive state) based on a random access process. For example, a Msg3 in a 4-step random access process or a Msg A in a 2-step random access process may be used by the UE to join the one or more multicast groups. For example, the Msg3 in the 4-step random access process or the Msg A in the 2-step random access process may be used to indicate the UE interest in the one or more multicast groups. The RRC release message (e.g., the suspend config IE of the RRC release message) may comprise configuration parameters for the random access process during the RRC inactive state. For example, the RRC release message may comprise random access configuration parameters for small data transmission (SDT) during the RRC inactive state.

In some examples, receiving the multicast configuration parameters (e.g., while in the RRC inactive state) may be based on a random access process (e.g., a Msg B of a 2-step random access process or a Msg 4 of a 4-step random access process). In some examples, the same random access process used for joining the one or more multicast groups and/or interest indication may be used for receiving the multicast configuration parameters.

In some examples, the UE may join the one or more multicast groups (e.g., after transitioning to the RRC inactive state) based on a configured grant. The UE may transmit a transport block based on radio resources of the configured grant and may indicate the request for joining the one or more multicast groups and/or for interest indication for the one or more multicast groups. In some examples, the RRC release message (e.g., a suspend config IE of the RRC release message) may comprise configured grant configuration parameters indicating the radio resources of the configured grant. The UE may determine the radio resources of the configured grant based on the configured grant configuration parameters.

In some examples, receiving the multicast configuration parameters for receiving the multicast data during the RRC inactive state may be based on one or more pre-configured downlink assignments during the RRC inactive state. The UE may receive one or more transport blocks based on the one or more pre-configured downlink assignments. The one or more transport blocks may comprise the multicast configuration parameters.

In some examples, receiving the multicast configuration parameters for receiving the multicast data during the RRC inactive state may be based on one or more SPS downlink assignments during the RRC inactive state. The UE may receive SPS configuration parameters of one or more SPS configurations indicating radio resources of the one or more downlink SPS assignments. For example, the UE may receive the SPS configuration parameters based on an RRC release message or a suspend config IE included in the RRC release message. The UE may determine radio resources of the one or more downlink SPS assignments based on the SPS configuration parameters. The UE may receive one or more transport blocks based on the one or more downlink SPS assignments. The one or more transport blocks may comprise the multicast configuration parameters.

In an example embodiment as shown in FIG. 18, the UE may receive an RRC release message indicating transitioning from an RRC connected state to an RRC inactive state. The UE may determine a BWP for reception of both of the paging during the RRC inactive state and for receiving multicast data during the RRC inactive state. The UE may receive the multicast data and paging based on the determined BWP.

In some examples, the determined BWP may be the initial BWP of a cell used for receiving paging information, i.e., the same initial BWP of a cell that is for receiving the paging information may be used for receiving the multicast related data and/or signaling. In some examples, the common frequency resource (CFR) associated with the multicast data may be in the initial BWP for paging during the RRC inactive state. The CFR may be used for receiving scheduling information associated with the multicast data.

In some examples, the determined BWP may be the same BWP used in the RRC connected state for receiving multicast data and/or signaling (e.g., the BWP comprising the CFR) and the UE may receive the paging information via the same BWP. While in the RRC inactive state, the UE may receive the paging information via the same BWP associated with multicast data reception.

In an example embodiment as shown in FIG. 19, the UE may receive an RRC release message indicating transitioning from an RRC connected state to an RRC inactive state. The RRC release message (e.g., a suspend config IE of the RRC release message) may comprise an information element indicating whether UE feedback transmission (e.g., UE feedback associated with multicast data in the RRC inactive state, e.g., HARQ feedback, CSI report, etc.) during the RRC inactive state is enabled or disabled. For example, a first value of the information element may indicate that the UE feedback during the RRC inactive state is enabled and a second value of the information element may indicate that the UE feedback during the RRC inactive state is disabled. Based on the information element indicating that the UE feedback during the RRC inactive state is enabled, the UE may transmit the UE feedback. The UE may transmit the UE feedback based on a PUSCH (e.g., based on a configured grant resource during the RRC inactive state, e.g., for SDT), PRACH (e.g., for SDT) or via a PUCCH during the RRC inactive state. For example, the UE feedback may be a HARQ feedback and a random access preamble may indicate the HARQ feedback (for example, ACK based on one or more first random access preambles and NACK based on one or more second random access preambles).

In an example embodiment as shown in FIG. 20, the UE may receive an RRC release message indicating transitioning from an RRC connected state to an RRC inactive state. The UE may determine, based on one or more multicast configuration parameters, whether the UE is allowed to receive multicast data during the RRC inactive state. The one or more multicast configuration parameters used in the determination may include one or more RSRP thresholds (e.g., associated with one or more reference signals), one or more timer values, etc. In response to the determining indicating that the UE is allowed to receive multicast data during the RRC inactive state, the UE may receive multicast data. In some examples, in response to the determining indicating that the UE is not allowed to receive multicast data during the RRC inactive state, the UE may transition to an RRC connected state to receive the multicast data. In some examples, the UE may further determine whether to transmit UE feedback during the RRC inactive state based on the one or more multicast configuration parameters.

In an example embodiment, a user equipment (UE) may use a method of multicast data delivery in a radio resource control (RRC) inactive state. The UE may receive an RRC release message indicating transitioning of the UE from an RRC connected state to the RRC inactive state. The UE may receive, while in the RRC inactive state, multicast data in response to joining a multicast group and receiving multicast configuration parameters.

In some examples, the UE may, while in the radio resource control (RRC) connected state and before receiving the RRC release message, join the multicast group and receive the multicast configuration parameters.

In some examples, the multicast configuration parameters comprise first multicast configuration parameters for multicast data reception during the radio resource control (RRC) connected state and second multicast configuration parameters for multicast data reception during the radio resource control (RRC) inactive state.

In some examples, the UE may, while in the radio resource control (RRC) inactive state and after receiving the RRC release message, perform at least one of: joining the multicast group; and receiving the multicast configuration parameters. In some examples, the joining the multicast group may be while in the radio resource control (RRC) inactive state; and the receiving the multicast configuration parameters may be after transitioning to the RRC connected state. In some examples, the joining the multicast group, while in the radio resource control (RRC) inactive state, may be based on a random access process. In some examples, the joining the multicast group may be via a MsgA of a two-step random access process or a Msg3 of a four-step random access process. In some examples, the radio resource control (RRC) release message may comprise one or more configuration parameters for the random access process. In some examples, the receiving the multicast configuration parameters, while in the radio resource control (RRC) inactive state, may be based on the random access process. In some examples, the receiving the multicast configuration parameters, while in the radio resource control (RRC) inactive state, may be based on a MsgB of a two-step random access process or a Msg4 of a four-step random access process. In some examples, the joining the multicast group, while in the RRC inactive state, may be based on a configured grant. In some examples, the UE may transmit a transport block, via radio resources of the configured grant, indicating the request to join the multicast group. In some examples, the radio resource control (RRC) release message may comprise configured grant configuration parameters. In some examples, the UE may determine the configured grant based on the configured grant configuration parameters. In some examples, receiving the multicast configuration parameters, while in the radio resource control (RRC) inactive state, may be based on a pre-configured downlink assignment in the RRC inactive state. In some examples, the UE may receive a downlink transport block, comprising the multicast configuration parameters, based on the pre-configured downlink assignment. In some examples, receiving the multicast configuration parameters, while in the radio resource control (RRC) inactive state, may be based on a semi-persistent scheduling (SPS) downlink assignment in the RRC inactive state. In some examples, the radio resource control (RRC) release message may comprise semi-persistent scheduling (SPS) configuration parameters. In some examples, the UE may determine the semi-persistent scheduling (SPS) downlink assignment based on the SPS configuration parameters.

In an example embodiment a user equipment (UE) may use a method of multicast data delivery in a radio resource control (RRC) inactive state. The UE may receive an RRC release message indicating transitioning of the UE from an RRC connected state to the RRC inactive state. In response to joining a multicast group, the UE may determine a bandwidth part (BWP) for reception of paging information and multicast data during the RRC inactive state. The UE may receive the paging information and the multicast data via the determined BWP.

In some examples, the determined bandwidth part (BWP) may be an initial BWP for paging during the radio resource control (RRC) inactive state. In some examples, a common frequency resource (CFR) associated with the multicast data may be in the initial BWP for paging during the radio resource control (RRC) inactive state. In some examples, the common frequency resource (CFR) may be used for receiving scheduling information associated with the multicast data.

In some examples, the determined bandwidth part (BWP) may be a BWP, associated with multicast data, comprising a common frequency resource (CFR). In some examples, while in the radio resource control (RRC) inactive state, the BWP associated with the multicast data may be used for reception of paging information.

In an example embodiment, a user equipment (UE) may use a method for multicast data in a radio resource control (RRC) inactive state. The UE may receive an RRC release message: indicating transitioning of the UE from an RRC connected state to the RRC inactive state; and comprising an information element indicating whether UE feedback transmission during the RRC inactive state is enabled or disabled. The UE may transmit, while in the RRC inactive state, UE feedback in response to the information element indicating that the UE feedback during the RRC inactive state is enabled.

In some examples, the user equipment (UE) feedback may be associated with multicast data transmission.

In some examples, the user equipment (UE) feedback may be a hybrid automatic repeat request (HARQ) feedback.

In some examples, the user equipment (UE) feedback may be channel state information (CSI) report.

In some examples, transmitting the UE feedback may be based on an uplink control channel or an uplink shared channel or a random access channel. In some examples, transmitting the UE feedback may be based on a configured grant resource. In some examples, transmitting the UE feedback may be based on a random access process.

In some examples, the user equipment (UE) feedback may be a hybrid automatic repeat request (HARQ) feedback. Transmitting the UE feedback may be based on a random access preamble. In some examples, the user equipment (UE) feedback may be for hybrid automatic repeat request (HARQ) negative acknowledgment (NACK).

In an example embodiment, a user equipment (UE) may use a method of feedback for multicast data in a radio resource control (RRC) inactive state. The UE may receive an RRC release message indicating transitioning from an RRC connected state to the RRC inactive state. The UE may determine, based on one or more multicast configuration parameters, whether the UE is allowed to receive multicast data during the RRC inactive state. The UE may receive the multicast data based on the determining indicating that the UE is allowed to received multicast data.

In some examples, the one or more multicast configuration parameters may comprise one or more received signal received strength (RSRP) thresholds or one or more time values.

In some examples, the UE may transition to the radio resource control (RRC) connected state in response to the determining indicating that the UE is not allowed to receive multicast data during the RRC inactive state.

In some examples, the UE may determine whether to transmit user equipment (UE) feedback associated with the multicast data based on the one or more multicast configuration parameters.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both (B, C) and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The invention claimed is:

1. A method of multicast data delivery in a radio resource control (RRC) inactive state, comprising the steps of:
    receiving, by a user equipment (UE) in an RRC connected state, an RRC release message indicating transitioning of the UE from the RRC connected state to an RRC inactive state; and
    receiving, while in the RRC inactive state, multicast data in response to joining a multicast group and receiving multicast configuration parameters,
    wherein the multicast configuration parameters are conveyed in the RRC release message and comprise a first set of parameters for multicast reception in the RRC connected state and a second set of parameters for multicast reception in the RRC inactive state, the second set of parameters including paging occasion information and semi-persistent scheduling information for multicast reception in the RRC inactive state.

2. The method of claim 1, further comprising, while in the radio resource control (RRC) connected state and before receiving the RRC release message, the user equipment (UE):
    joining the multicast group; and
    receiving the multicast configuration parameters.

3. The method of claim 1, wherein the multicast configuration parameters comprise first multicast configuration parameters for multicast data reception during the radio resource control (RRC) connected state and second multicast configuration parameters for multicast data reception during the radio resource control (RRC) inactive state.

4. The method of claim 1, further comprising, while in the radio resource control (RRC) inactive state and after receiving the RRC release message, the user equipment (UE):
    joining the multicast group; or
    receiving the multicast configuration parameters; or
    both.

5. The method of claim 4, wherein:
    joining the multicast group occurs while the user equipment (UE) in the radio resource control (RRC) inactive state; and
    the UE receiving the multicast configuration parameters after transitioning to the RRC connected state.

6. The method of claim 4, wherein joining the multicast group, while the user equipment (UE) is in the radio resource control (RRC) inactive state, occurs based on a random access process.

7. The method of claim 6, wherein joining the multicast group via a message A (MsgA) of a two-step random access process or a message 3 (Msg3) of a four-step random access process.

8. The method of claim 6, wherein the radio resource control (RRC) release message comprises one or more configuration parameters for the random access process.

9. The method of claim 6, wherein receiving the multicast configuration parameters, while the user equipment (UE) is in the radio resource control (RRC) inactive state, occurs based on the random access process.

10. The method of claim 4, wherein receiving the multicast configuration parameters, while the user equipment (UE) is in the radio resource control (RRC) inactive state, occurs based on a pre-configured downlink assignment in the RRC inactive state.

11. The method of claim 10, further comprising the user equipment (UE) receiving a downlink transport block, comprising the multicast configuration parameters, based on the pre-configured downlink assignment.

12. The method of claim 4, wherein receiving the multicast configuration parameters, while the user equipment (UE) is in the radio resource control (RRC) inactive state, occurs based on a semi-persistent scheduling (SPS) downlink assignment in the RRC inactive state.

13. The method of claim 12, wherein the radio resource control (RRC) release message comprises semi-persistent scheduling (SPS) configuration parameters.

14. The method of claim 13, further comprising determining the semi-persistent scheduling (SPS) downlink assignment based on the SPS configuration parameters.

15. A method of multicast data delivery in a radio resource control (RRC) inactive state, comprising the steps of:
    receiving, by a user equipment (UE) in an RRC connected state, an RRC release message indicating transitioning of the UE from the RRC connected state to an RRC inactive state; and receiving, while in the RRC inactive state, multicast data in response to joining a multicast group and receiving multicast configuration parameters;

wherein, while in the radio resource control (RRC) inactive state and after receiving the RRC release message, the user equipment (UE):

joining the multicast group; or receiving the multicast configuration parameters, or both:

wherein joining the multicast group, while the user equipment (UE) is in the radio resource control (RRC) inactive state, occurs based on a random access process, wherein receiving the multicast configuration parameters, while the user equipment (UE) is in the radio resource control (RRC) inactive state, occurs based on the random access process, and wherein receiving the multicast configuration parameters, while the user equipment (UE) is in the radio resource control (RRC) inactive state, occurs based on a message B (MsgB) of a two-step random access process or a message 4 (Msg4) of a four-step random access process.

16. A method of multicast data delivery in a radio resource control (RRC) inactive state, comprising the steps of:

receiving, by a user equipment (UE) in an RRC connected state, an RRC release message indicating transitioning of the UE from the RRC connected state to an RRC inactive state; and receiving, while in the RRC inactive state, multicast data in response to joining a multicast group and receiving multicast configuration parameters;

wherein, while in the radio resource control (RRC) inactive state and after receiving the RRC release message, the user equipment (UE):

joining the multicast group; or receiving the multicast configuration parameters; or both; and wherein joining the multicast group, while the user equipment (UE) is in the radio resource control (RRC) inactive state, occurs based on a configured grant.

17. The method of claim 16, further comprising transmitting a transport block, via radio resources of the configured grant, the transport block indicating the request to join the multicast group.

18. The method of claim 16, wherein the radio resource control (RRC) release message comprises configured grant configuration parameters.

19. The method of claim 18, further comprising determining the configured grant based on the configured grant configuration parameters.

20. A method of multicast data delivery in a radio resource control (RRC) inactive state, comprising the steps of:

receiving, by a user equipment (UE) in an RRC connected state, an RRC release message indicating transitioning of the UE from the RRC connected state to an RRC inactive state the RRC release message further conveying multicast configuration parameters; and in response to joining a multicast group, determining a bandwidth part (BWP) for reception of paging information and multicast data during the RRC inactive state based on the multicast configuration parameters conveyed in the RRC release message, the multicast configuration parameters including paging occasion information and semi-persistent scheduling information for multicast reception in the RRC inactive state; and receiving the paging information and the multicast data via the determined BWP.

\* \* \* \* \*